(12) United States Patent
Baker et al.

(10) Patent No.: US 7,536,676 B2
(45) Date of Patent: May 19, 2009

(54) OBJECT PROCESS GRAPH APPLICATION CONTROLLER-VIEWER

(75) Inventors: David Marvin Baker, Branford, CT (US); Steven Allen Gold, Madison, CT (US); Vladmir Gusev, Guilford, CT (US); Hongping Liang, Woodbridge, CT (US)

(73) Assignee: Newalliance Bank, New Haven, CT (US)

( * ) Notice: Subject to any disclaimer, the term of this patent is extended or adjusted under 35 U.S.C. 154(b) by 501 days.

(21) Appl. No.: 11/162,416

(22) Filed: Sep. 9, 2005

(65) Prior Publication Data

US 2006/0059461 A1    Mar. 16, 2006

Related U.S. Application Data

(60) Provisional application No. 60/608,563, filed on Sep. 10, 2004.

(51) Int. Cl.
*G06F 9/44* (2006.01)

(52) U.S. Cl. .................. 717/113; 717/100; 717/101; 717/105; 717/110; 717/111

(58) Field of Classification Search .......... 717/100–105, 717/110–113
See application file for complete search history.

(56) References Cited

U.S. PATENT DOCUMENTS

| | | | |
|---|---|---|---|
| 5,295,256 A | 3/1994 | Bapat | .......................... 395/500 |
| 5,504,917 A | 4/1996 | Austin | |
| 5,768,586 A | 6/1998 | Zweben et al. | |
| 5,801,687 A | 9/1998 | Peterson et al. | |
| 6,016,394 A * | 1/2000 | Walker | ....................... 717/104 |
| 6,163,776 A | 12/2000 | Periwal | ......................... 707/4 |
| 6,292,803 B1 | 9/2001 | Richardson et al. | ......... 707/102 |
| 6,314,559 B1 | 11/2001 | Sollich | .......................... 717/5 |
| 6,425,016 B1 | 7/2002 | Banavar et al. | |
| 6,449,657 B2 | 9/2002 | Stanbach, Jr. et al. | ....... 709/245 |
| 6,701,513 B1 | 3/2004 | Bailey | |
| 6,708,179 B1 | 3/2004 | Arora | ......................... 707/102 |
| 6,988,270 B2 | 1/2006 | Banavar et al. | |

(Continued)

FOREIGN PATENT DOCUMENTS

CA    2 256 931 A1    6/2000

(Continued)

OTHER PUBLICATIONS

PCT Search Report for PCT/US2005/018942.

(Continued)

*Primary Examiner*—Wei Y Zhen
*Assistant Examiner*—Matthew J Brophy
(74) *Attorney, Agent, or Firm*—Cantor Colburn LLP

(57) ABSTRACT

An object process graph (OPG) application development system. The system includes an OPG application program interface (API), an OPG application editor, an OPG application window editor, and an OPG application notation. The OPG API provides access to functions of an OPG system. The OPG application editor facilitates the creating and editing of the OPG applications via the OPG API. The OPG application window editor facilitates the editing of OPG application user interface windows while an OPG application is running. The OPG application notation includes a plurality of key words and associated definitions for describing and defining OPG applications.

31 Claims, 22 Drawing Sheets

U.S. PATENT DOCUMENTS

| | | | |
|---|---|---|---|
| 7,000,190 B2 | 2/2006 | Kudukoli et al. | |
| 7,047,518 B2* | 5/2006 | Little et al. | 717/108 |
| 7,076,740 B2 | 7/2006 | Santori et al. | |
| 7,317,959 B2* | 1/2008 | Pfander et al. | 700/97 |
| 2001/0018690 A1 | 8/2001 | Tung Ng et al. | 707/103 |
| 2002/0091990 A1* | 7/2002 | Little et al. | 717/105 |
| 2002/0184610 A1 | 12/2002 | Cong et al. | |
| 2002/0194155 A1 | 12/2002 | Aldridge et al. | 707/1 |
| 2003/0172091 A1 | 9/2003 | Norcott | 707/203 |
| 2004/0025171 A1 | 2/2004 | Barinov et al. | |
| 2004/0181544 A1 | 9/2004 | Anderson | 707/102 |
| 2005/0039161 A1* | 2/2005 | Pfander et al. | 717/105 |
| 2005/0071805 A1 | 3/2005 | Lauterbach et al. | 717/104 |
| 2005/0262485 A1* | 11/2005 | Plante | 717/136 |
| 2005/0273773 A1 | 12/2005 | Gold et al. | |
| 2006/0059461 A1 | 3/2006 | Baker et al. | |

FOREIGN PATENT DOCUMENTS

| | | |
|---|---|---|
| WO | WO 01/25915 A1 | 4/2001 |

OTHER PUBLICATIONS

David J. Anderson; "Using MCV Pattern in Web Interactions;" Internet Article Jul. 22, 2000, pp. 1-22.

"Strut's User's Guide;" Internet Article Jul. 25, 2001 p. 1-5.

C. Russel; "Java Data Objects, JSR 12, Version 1.0.1;" Internet Article May 31, 2003, pp. 1-61.

A. Herbert et al.; "A Graphical Specification System for User-Interface Design;" IEEE Software vol. 7 Jul. 1990 No. 4.

PCT Search Report PCT/US2005/021440.

PCT Search Report PCT/US2005/022192 mailed Nov. 11, 2005.

D. J. Anderson; "Using MVC Pattern in Web Interactions;" [online]; [retrieved on Jul. 22, 2000]; retieved from the Internet at http://www.uidesign.net/articles/papers/.

"Struts User's Guide;" [online]; [retrieved on Jul. 25, 2001].

J. Rumbaugh; "State Trees as Structured Finite State Machines for User Interfaces;" Procedings of the ACM Siggraph Symposium on User Interface Software, 1998; pp. 15-29.

Borland Software Corporation, "User Guide for Together ControlCenter and Together Solo", Updated Mar. 24, 2004.

Thomas Eisenbarth, Rainer Koschke, and Gunther Vogel, "Static Trace Extraction", Proceedings of the Ninth Working Conference on Reverse Engineering.

PCT Search Report PCT/US2005/032114.

Koo, Hsueh-Yung Benjamin, "A Meta-Language for Systems Architecting", Massachusetts Institute Of Technology, Jan. 2005, 168 pgs.

Zhang, Kang. "Design, Construction, and Application of a Generic Visual Language Generation Environment". IEEE, 2001. 0098-5589/01.

Wasserman, Anthony I., et al. "A Graphical, Extensible Integrated Environment for Software Development", p. 131-142, 1986 ACM 0-89791-212-8/86/0012/131, retrieved Aug. 2, 2006. Interactive Development Environments, Inc.

Liu, Chung-Shyan. "An Object-Based Approach to Protocol Software Implementation", p. 307-316, 1994 ACM, retrieved Aug. 2, 2006. Department of Information and Computer Engineering, Chun Yuan C. University.

Borger, Egon, et al. "Modeling the Meaning of Transitions from and to Concurrent States in UML State Machines", p. 1086-1091, ACM Feb. 3, 2003 1-58113-624, retrieved Aug. 3, 2006.

Knight, Alan, et al. "Objects and the Web", p. 51-59, Mar./Apr. 2002 IEEE, retrieved Aug. 2, 2006. Focus Engineering Software, 07-7459/02.

Arefi, Farahangiz, et al. "The Object-Oriented Design of a Visual Syntax-Directed Editor Generator". IEEE, 1989. 0730-3157/89/0000/0389. School of Computer Science Florida International University.

Reid G. Smith, et al., Impulse-86 A Substrate for Object-Oriented Interface Design, Sep. 1986 OOPSLA '86 Proceedings, pp. 167-176.

* cited by examiner

*FIG. 18*

OBJECT PROCESS GRAPH APPLICATION CONTROLLER-VIEWER

CROSS REFERENCE TO RELATED APPLICATIONS

The present application claims the benefit of provisional application No. 60/608,563 filed Sep. 10, 2004, the content of which is herein incorporated by reference in its entirety.

BACKGROUND OF THE INVENTION

The present invention relates to software application program development tools and environments including integrated development environments (IDEs), rapid application development (RAD) systems, and graphical user interface (GUI) tools that enable the creation and editing of either static or dynamic computer applications. In particular, the present invention relates to the creation and editing of object process graphs, which are described subsequently herein.

The present application is related to two copending applications: U.S. patent application Ser. No. 10/908,654 entitled "Object Process Graph System" filed on May 20, 2005; and U.S. patent application Ser. No. 10/908,653 entitled "Object Process Graph Application Controller-Viewer" filed on May 20, 2005. Both applications are incorporated by reference herein in their entirety.

Since the development of assembly language in the 1950's the computer industry has witnessed a series of incremental advances in software development. These advances have allowed software to be developed faster, with less manual labor, and made possible the creation of more complex software systems and improved the reliability of software systems in general. These advances include the development of 3rd generation programming languages like COBOL and Fortran; fourth generation programming languages like FOCUS; object oriented programming languages like Smalltalk, C++ and Java; CASE tools like Rational Rose; relational database systems like Oracle and DB2 and object oriented database systems like GemStone and Versant. However, despite these advances the development of a large systems is still an expensive, high-risk venture that requires many highly-skilled programmers and there is always considerable uncertainty regarding the quality and applicability of the final system.

Fifth generation programming languages and their associated development environments, such as, LabVIEW and MATLAB Simulink are designed to elevate the development productivity achieved by using the fourth generation languages to the next level. They allow non-programmers to use computing power in terms that closely resemble their specific problem domains. Features of the fifth generation language environments typically include an integrated persistent data management system, a query language, report generators and a user interface definition facility, and can be complemented by a graphics generator, decision support function, financial modeling, spreadsheet capability, statistical analysis functions and parameterized business and domain models. However, the most widespread embodiments of the fifth generation language tools have targeted highly specialized and relatively narrow domains, such as instrument data acquisition (LabVIEW), signal processing, process control, mechanical modeling, microarray data handling, communication system design, etc.

BRIEF DESCRIPTION OF THE INVENTION

The present invention defines and implements object process graph application development systems.

One aspect is an object process graph application development system including an object process graph application description notation and an object process graph application editor. The notation provides a set of keywords and associated definitions that enable a developer to define all application data and functionality including, but not limited to, data structures, data transformations, processing steps and calculations. The application editor provides an editable graphic representation of applications using iconic representations of the notation keywords.

Another aspect is an object process graph application development system including an object process graph application description notation, an object process graph application editor, and an object process graph application window editor. The notation defines that meaning of keywords and their iconic representation. The editor provides an editable representation of application data and process information. The window editor enables an application developer or user to create and edit an application's user interface while the application is running.

A further aspect is an object process graph application development system including an object process graph application description notation, an object process graph application editor, an object process graph application window editor and an object process graph application program interface. The notation provides application component definitions. The application editor provides an editable graphic representation of an object process graph application. The window editor provides users and developers the functionality needed to create and edit an application's user interface while the application is running. The object process graph application program interface provides a definition of interface functions and implements access methods that allow application programs to interface directly with an object process graph application.

Further aspects are a method and computer program product for developing a computer system. The method includes receiving a command specifying an element in a graph structure and modifying the computer program in real time in response to the command. The graph structure is a computer program.

Still further aspects are a method and computer program product for developing a computer system. The method includes creating a computer program as a graph structure and displaying a graphical representation of the graph structure on a user interface screen. A command specifying an element in the graphic structure is received. The computer program is modified in real time in response to the command. In addition, the graph structure is updated in response to the command. A graphical representation of the updated graph structure is displayed on the user interface screen.

Exemplary embodiments of the present invention include many advantages, including reducing the costs and risks involved in building large, complex object process graph application systems. Application users and application domain experts are able, with minimal computer training, to develop and maintain customized, complex object process graph application systems. It is possible to create applications that can be modified at run-time in order to greatly broaden the scope, flexibility and usefulness of software application systems. In addition, the present invention provides interfaces that make it possible to integrate object process graph application and traditional software applications.

BRIEF DESCRIPTION OF THE SEVERAL VIEWS OF THE DRAWINGS

These and other features, aspects and advantages of the present invention will become understood with regard to the following description, appended claims and accompanying drawings, where:

FIG. 18 is a data visibility and editing property editor window according to exemplary embodiments of the present invention;

DETAILED DESCRIPTION OF THE INVENTION

Figure 1:
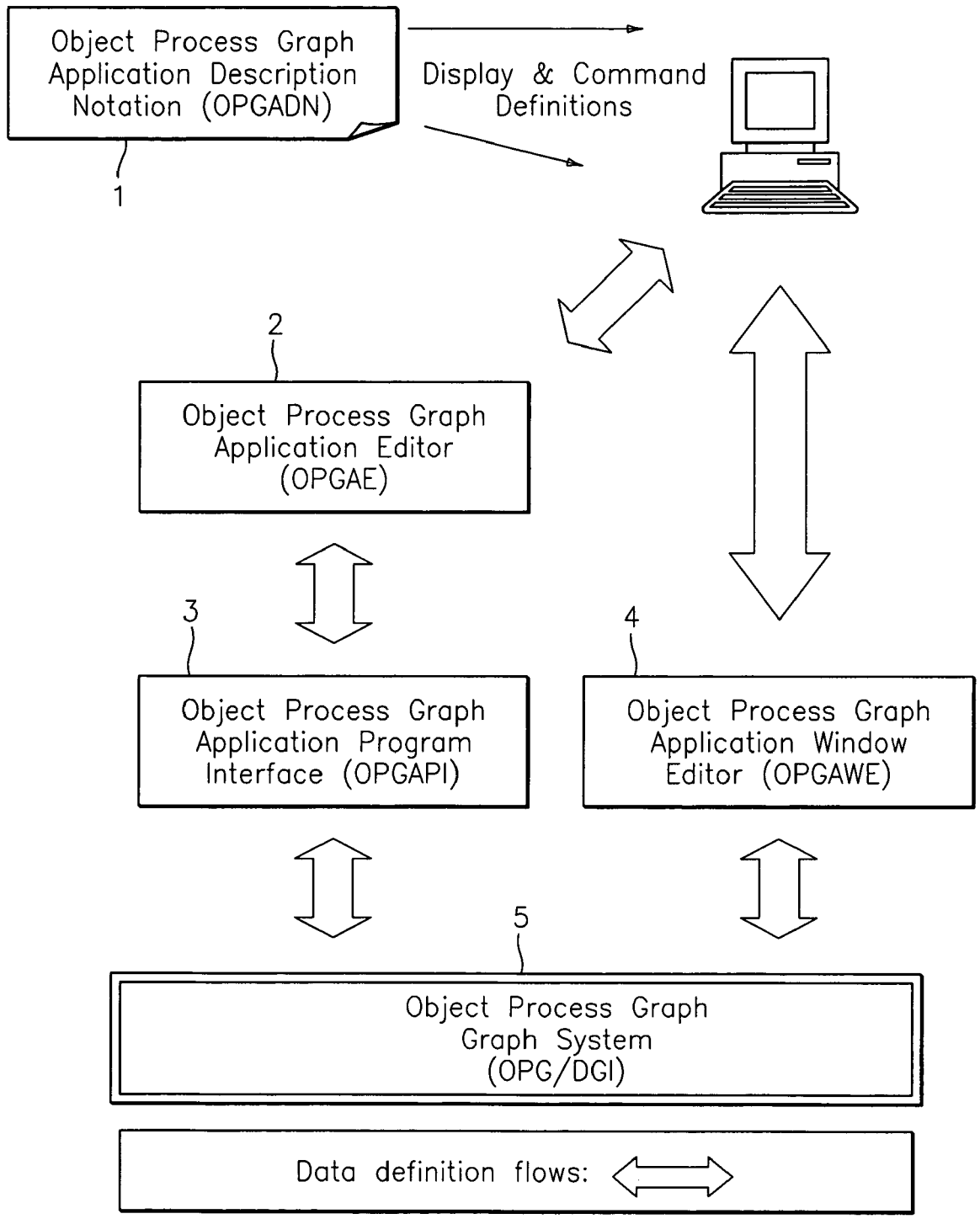
FIG. 1 is an Object Process Graph Application Development System (OPGADS) according to exemplary embodiments of the present invention.

Aspects of exemplary embodiments of the present invention include a complete environment for developing object process graph (OPG) applications. Exemplary embodiments, such as the one depicted in FIG. 1, include four major components (FIG. 1): an Object Process Graph Application Description Notation (OPGADN) 1, an Object Process Graph Application Editor (OPGAE) 2, an Object Process Graph Application Window Editor (OPGAWE) 4 and an Object Process Graph Application Program Interface (OPGAPI) 3. The OPGAE 2 and the OPGAPI 3 are tightly integrated with an OPG System 5 described subsequently herein.

Exemplary embodiments of the OPGADN 1 component include a set of key words and associated definitions that enable application developers, users and domain experts to completely define an application's complex processing steps, data manipulations, transformations and definitions. The key words represent and are mapped to OPG elements that define applications.

Exemplary embodiments of the OPGAE 2 component are fully-featured editing environments for defining and updating OPG applications. They can be implemented as stand-alone or WEB-based computer software systems. Exemplary embodiments use functions defined by the OPGAPI 3 to directly interact with and modify OPG applications through a dynamic graph interpreter (DGI). They render graphical representations of OPG applications to developers that closely correlate to actual OPG application structures. The graphical representations include graphical symbols and structures that developers can manipulate with editing commands entered via a keyboard, computer mouse or other input device.

Exemplary embodiments of the OPGAWE 4 component provide a "what you see is what you get" (WYSIWYG) style editor for updating the definition of windows on which OPG application data are displayed, and a special editor for defining and modifying the visibility and mutability of data elements. Changes are made to windows and display properties prior to running a program, or on the fly, as the program is being interpreted by the DGI. Exemplary embodiments of the OPGAWE 4 also provide commands for starting, stopping and monitoring OPG applications and for evaluating and changing application data. Exemplary embodiments are implemented as modules of the OPG application controller-viewer system (OPGACV) described subsequently herein.

Exemplary embodiments of the OPGAPI 3 component define a standard set of functions and associated parameters implemented by an OPG translator that includes standard OPG and DGI components that enable non-OPG applications (e.g., embodiments of the OPGAE 2), to interact with an OPG application. The OPGAPI 3 defines functions for starting, stopping, defining and modifying OPG applications. It also defines functions for inputting data to OPG applications and reporting their outputs.

Object Process Graph Application Description Notation (OPGADN)

In exemplary embodiments, the OPGADN 1 provides a set of keywords and associated definitions for the elements of an OPG application. The OPGADN 1 is used to describe the interface to OPG application editors. Other notations, such as the Universal Modeling Language (UML), can also be used to define an OPG program by modifying the meaning of some of the UML symbols. In addition, editors for other notations can produce an OPG program description that can be translated to an extensible markup language (XML) description of an OPG program. The following is a list of example OPGADN 1 terms and their definitions:

OPG Application—a computer software system defined as an OPG that can be interpreted (run) by a DGI in an OPG system 5. An OPG application is composed of data structures, operations and links that define relationships and data transformations.

Operation—a software element that defines temporal actions or ordered or unordered serializable or parallelizable sequences of program actions or steps. An operation roughly corresponds to a line of code within a high-level computer program, an operation or step within a workflow system, or a screen or window within an interactive or transactional system.

Process—an operation that groups a set of operations and gives the grouping a name. An OPG application is comprised of one or more processes.

Data Element—an item of data that has a name and a simple or complex value.

Data Structure—a data element that groups a set of primitive data elements, data structures, data arrays and data references. The grouped items are called attributes. Within a program, a data structure can be referenced and manipulated as a single entity.

Primitive Data—a data element that has a type and no substructure of data elements. Primitive data elements are attributes of data structures. A primitive data element includes display and processing functions that are unique to its type. A large set of primitive types are predefined, including: string, double, integer, date, file, image, mapping, XML file, computed, computed string, custom class, email address, web address, directory, spreadsheet cell, file transform, long integer, big decimal, binary, and relational table. Additional, domain specific data types can be added as required.

Data Structure Array—a homogenous n-dimension array of data structures. Data arrays are attributes of data structures.

Data Reference—an attribute of a data structure that points to a data structure. Data references can be defined such that they can be null (a 1 to 0 or 1 relationship) or never null (a 1 to 1 relationship).

Application State—the set of data element values and active operations at a point in the running of an application.

Link—a software structure that defines a transforming relationship (connection) between two OPG software elements. There are three link categories: operation-to-operation, which defines a relationship between two operations; operation-to-data, which defines a relationship between an operation and a data structure; and data-to-data, which defines a relationship between two data elements. All links have properties that define their names, direction, etc. The action defined by a link can be contingent on data instance comparisons. Within each link category there are link types defined below.

Display Link—an operation-to-operation link that defines the direction of control flow from one operation to another. Application state information is displayed as part of the transition to the receiving operation.

Queue Link—an operation-to-operation link that defines the direction of control flow from one operation to another. Application state information is placed in the receiving operation's queue awaiting an event.

Batch Link—an operation-to-operation link that defines the direction of control flow from one operation to another. Application state information is processed by the receiving operation immediately. Processing can be time scheduled.

Copy Link—a data-to-data link that defines copying the values of one data element to another. Such copies are data type aware, i.e. value conversions and replication is implicit. Link properties define conversions and other copy criteria.

Compute Link—a data-to-data link that defines a set of data transformations applied to data elements that produce a new data element. Compute links provide complex mathematical formulae and/or regular expressions to operate on any number of data elements to compute another data element.

Split Link—a data-to-data link that defines the distribution of data elements in one application state to one or more application states (application state is defined above).

Merge Link—a data-to-data link that defines gathering data elements in one or more application states into one application state.

Join Link—a data-to-data link that defines the concurrent retrieval of heterogeneous data elements (similar to relational database management system (RDBMS) joins).

Create Link—an operation-to-data link that defines the creation of a new data structure.

Retrieve Link—an operation-to-data link that defines the retrieval of data elements and adding them to an application state with that operation.

Execute Link—an operation-to-data link that defines the execution of program code or control structures contained within a data element with that operation.

Object Process Graph Application Editor (OPGAE)

The following provides a functional overview of exemplary embodiments of the OPGAE 2 component. The referenced figures, FIGS. 2-5, are window images showing the workspace provided by the OPGAE 2 and how graphical models of OPG applications are displayed. In exemplary embodiments, the OPGAE 2 is implemented as an Eclipse platform plug-in that displays the workspace as an Eclipse perspective.

In exemplary embodiments, the OPGAE 2 renders OPG applications within a workspace window on a personal computer (PC) monitor. The OPGAE workspace is a graphical user interface (GUI). The OPGAE 2 accepts user inputs from a PC's mouse or keyboard.

The OPGAE Workspace

Figure 2:
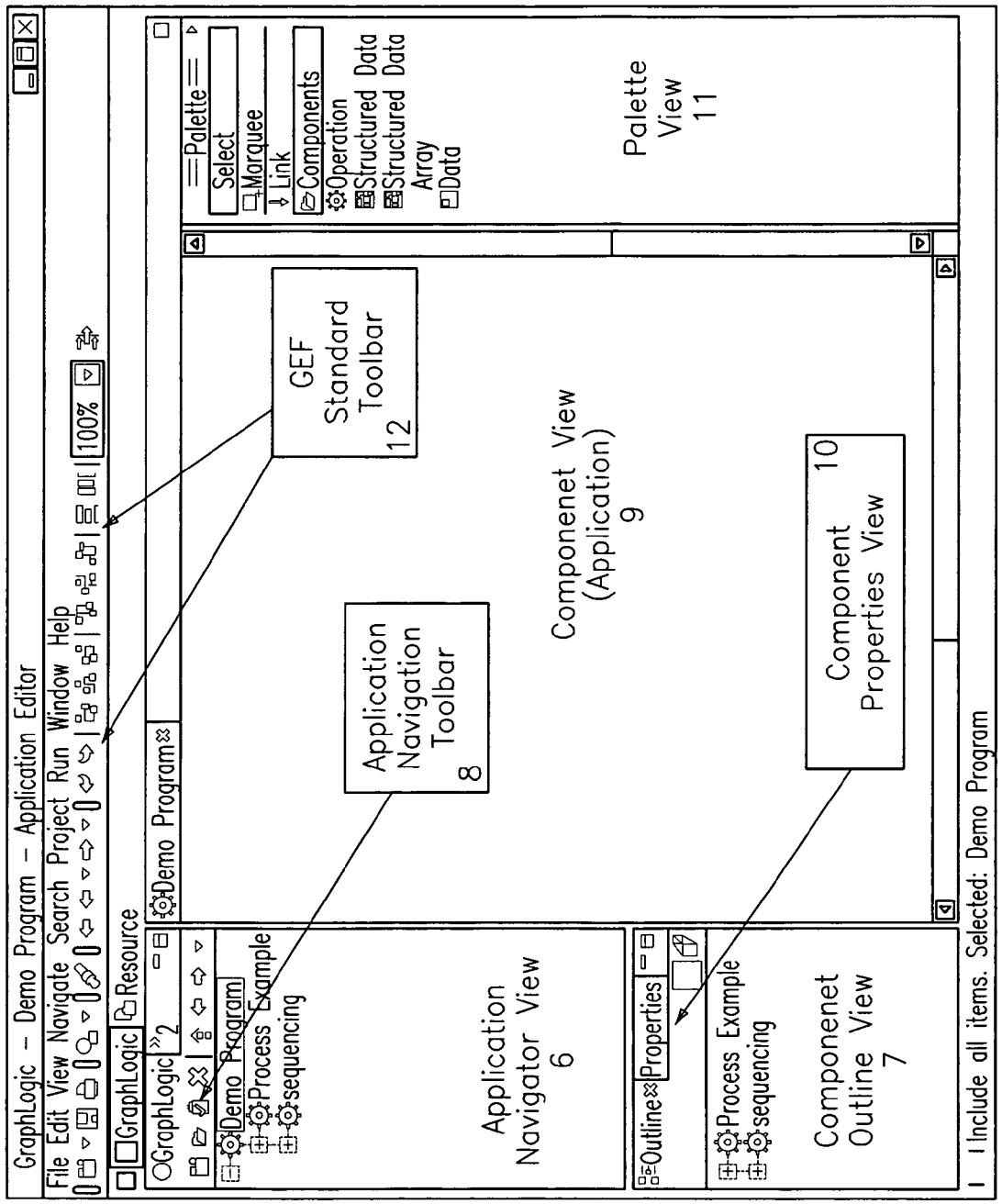
FIG. 2 is an Object Process Graph Application Editor (OPGAE) workspace displayed as an Eclipse perspective according to exemplary embodiments of the present invention.

In exemplary embodiments, such as the one depicted in FIG. 2, the OPGAE 2 provides an Eclipse perspective to display a graphical workspace on a PC monitor. The workspace enables a user to compose, select and update an OPG application. Applications are persisted in a repository (data source). The workspace enables a user to select a repository and select an application in a repository. It also provides access to every component and link of an application and to the properties associated with the components and links. A user defines or modifies an application by making selections from displayed lists and dragging and dropping components on the workspace using the PC's mouse and keyboard. The workspace display (e.g., the Eclipse perspective) is composed of a standard graph editing framework (GEF) tool bar 12 and six specialized views: palette view 11, component view 9, application navigator view 6, repository view (not shown), component outline view 7, and component properties view 10. These views can be rearranged in the editor window to suit a user's preferences. FIG. 2 shows a default arrangement of the display. The tab for the application navigator view 6 is labeled "GraphLogic" in FIG. 2. The application navigator view 6 has a small tool bar 8 that includes icons for creating a new application, opening an existing icon, reverting to the most recently loaded version of an application (throws away any changes) and deleting a selected item from the view. The arrangement in FIG. 2 is described in more detail below.

In exemplary embodiments, application components, links and primitive data attributes are represented by graphical symbols. Application components are represented by rectangles. A symbol representing a component's type is displayed in the upper left hand corner of a rectangle. Exemplary symbols and the components they represent are listed in the palette view 11 in FIG. 2.

Figure 3:
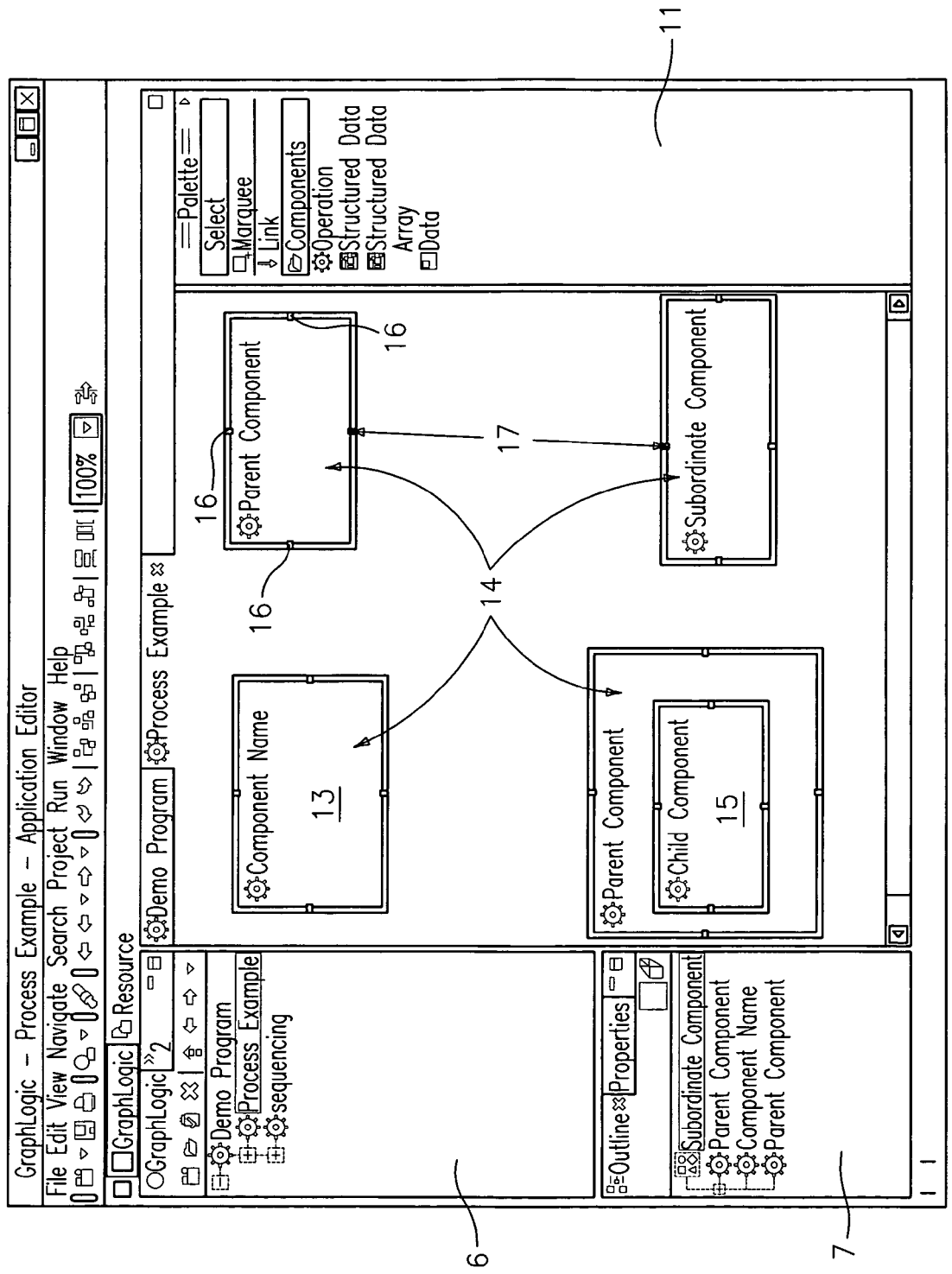
FIG. 3 is an OPGAE example according to exemplary embodiments of the present invention.

Some sample components of an OPG application are shown in the exemplary OPGAE workspace depicted in FIG. 3. The name of a component 13 is displayed at the top of a component rectangle when it is placed on a composition canvas 14. The remainder of the component rectangle is a composition canvas 14 on which its attribute components may be placed. Component rectangles can be resized and repositioned as child components 15 within an enclosing component's composition canvas. Component rectangles have four connection points 16 for links, one on each side. They are highlighted when the component rectangle is selected. Application links are represented by link lines 17. Link lines 17 are connected from a connection point 16 on a component rectangle to a connection point 16 on another or the same component rectangle. Link lines 17 have an arrowhead on one end pointing to the subordinate component. Data attributes are represented by small rectangles that contain a graphical symbol on the left followed by the name of the attribute. Data attribute symbols do not have a composition canvas since they cannot have any children. Selections are made on the workspace by positioning the mouse cursor on the PC over a selectable element and clicking the left button on the mouse.

The palette view 11 displays the OPG components that can be made part of an application. When a component is selected, the cursor is 'armed' with the component and will display the ok symbol as the cursor is moved over areas of the component view 9 where the selected component can be placed or the prohibited symbol in areas where the component cannot be placed. The cursor remains armed until a position for the element is selected by positioning the cursor in the desired position on the active component view 9 and clicking the left mouse button. The cursor can be 'disarmed' at any time by clicking the "select" choice on the palette. In addition, the cursor can be armed with a different component by clicking on a component selection on the palette view 11.

The palette view 11 provides the following component selections: operation, structured data, structured data array and data. The palette view 11 provides a link selection for linking one component to another and a marquee selection that makes it possible to select multiple components on a component's composition canvas 14. In exemplary embodiments, the default location for the palette view 11 is on the right side of the workspace.

Figure 4:
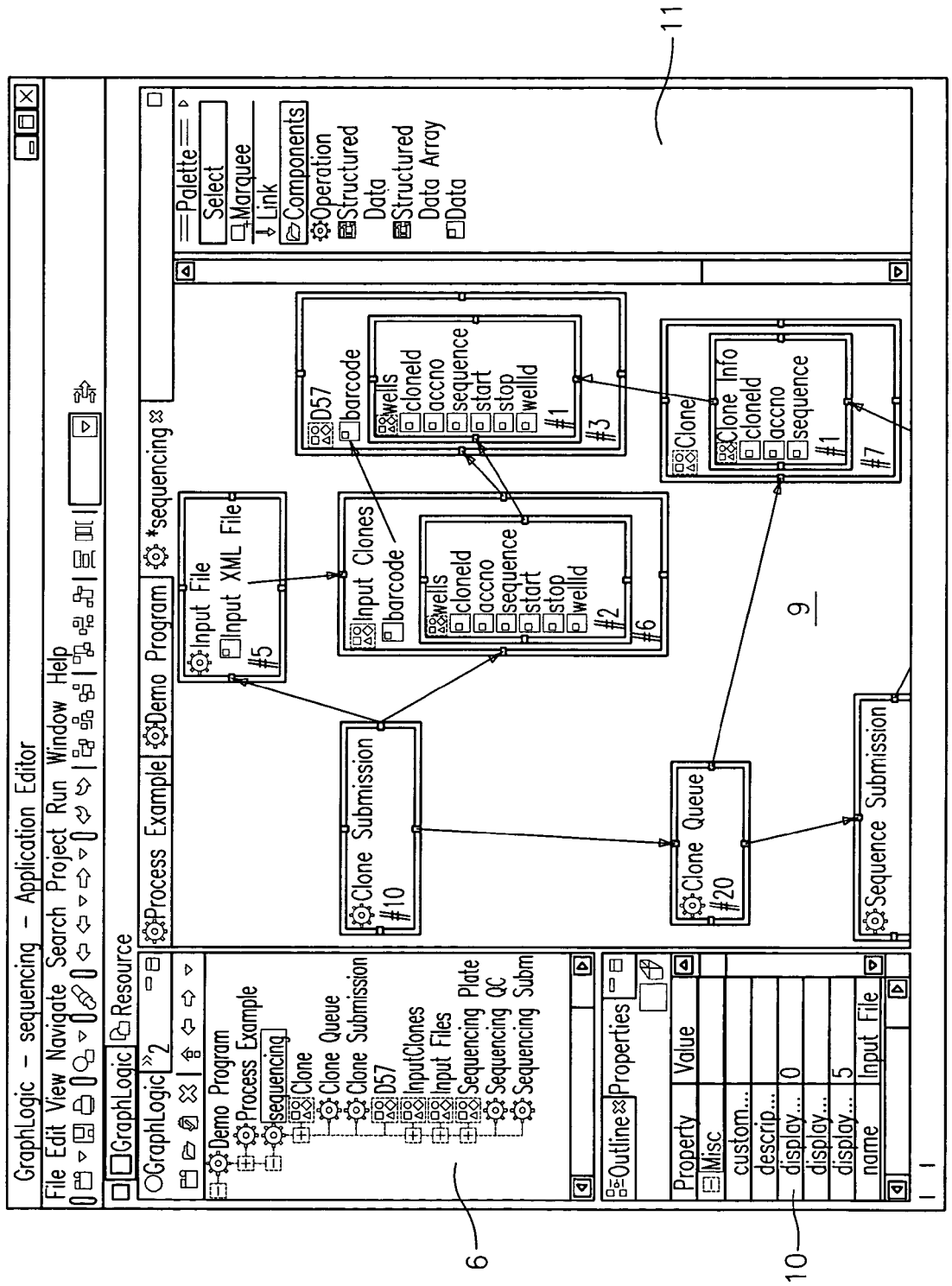
FIG. 4 is a sample Object Process Graph (OPG) application display according to exemplary embodiments of the present invention.

The component view 9, such as the exemplary component view 9 depicted in the exemplary OPGAE workspace in FIG. 4, displays a component's graph of components and/or attributes on a composition canvas 14. Multiple component views 9 can be open at one time. They are automatically stacked as they are opened with the most recently opened component view 9 at the top of the stack. The component view 9 at the top of the stack is the "active" view. Each component view 9 has a tab with the name of its component. Clicking on the tab brings its view to the top of the stack of views, thereby making it visible and active (the sequencing component is selected in FIG. 4). In exemplary embodiments, a component view 9 is a canvas on which components and connections can be placed. A component view 9 is closed by clicking the left mouse button on the 'X' on the view's tab.

A component or link displayed on an active component view 9 is selected by clicking the left button on the component or link graphical. A selected component has a highlighted border with small squares on each side showing connection points. Selected components may be resized or moved on a composition canvas 14 as desired. The component view 9 is the largest view. In exemplary embodiments, the component view 9 is located in the center of the OPGAE workspace window in the default arrangement with the palette view 11 on its right side and the application navigator toolbar 8, component outline view 7 and components property view 10 on the left.

The application navigator view 6 displays a tree view of an entire application making it possible to select any component of an application. Double clicking the left mouse button on a component in the application tree opens an active component view 9 on the selected component. The selection tab on the application navigator toolbar 8 has the title, "GraphLogic Application Navigator."

Figure 5:
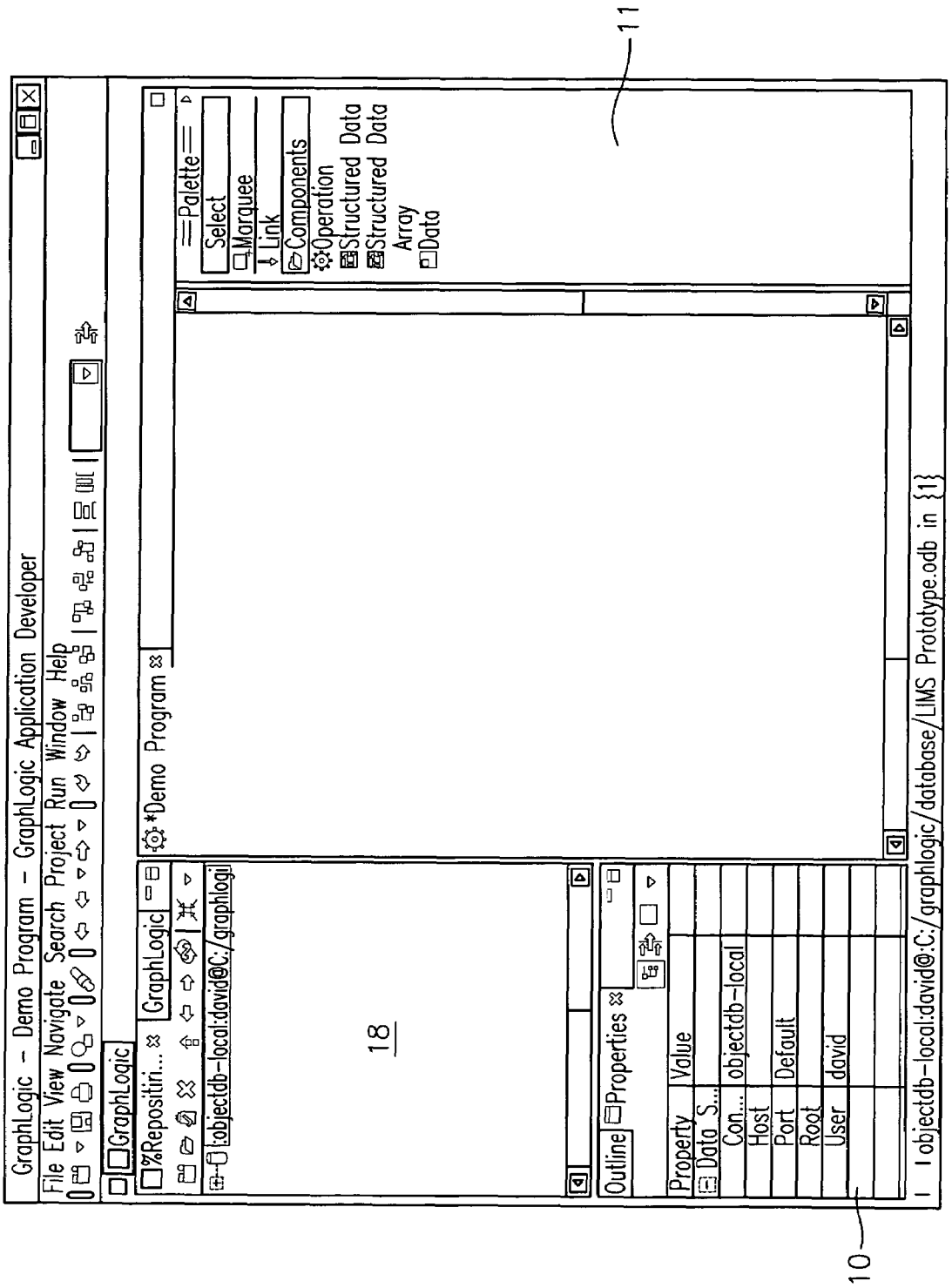
FIG. 5 is an OPGAE workspace showing a repository view according to exemplary embodiments of the present invention.

A repository view 18, such as the exemplary one depicted in the exemplary OPGAE workspace in FIG. 5, displays a list of OPG repositories in which OPG applications are persisted. The repository view 18 is an alternative to the application navigator toolbar 8 in this arrangement of the OPGAE 2 perspective. Either one can be selected by clicking on its respective tab.

Exemplary embodiments of the component outline view 7 display a tree view of the components in the active component view 9. Clicking on a component in the component outline view 7, selects (highlights) the component in the visible component view 9. The component outline view 7 is located on the lower left hand side of the workspace in the same area as the components property view 10. The component view 9 can be selected by clicking on its tab.

When a component or link graphical symbol is selected on the active component view 9, such as the one depicted in FIG. 4, its properties are displayed on the component properties view 10. Properties are displayed on a tabular list with the names of the properties in the left column and their current values in the right column. In FIG. 4, the component properties view 10 is depicted with a list of properties. Different sets of properties may be associated with each type of component or link. In exemplary embodiments, the component properties view 10 has category tabs for groups of related properties to simplify property selection.

The value of each property on the list is editable. In many cases they are simple dropdown lists with the valid selections shown.

The component properties view 10 is located on the lower left hand side of the workspace in the same area as the component outline view 7. The component properties view 10 can be selected by clicking on its tab.

OPGAE Editing Functions

Figure 6:
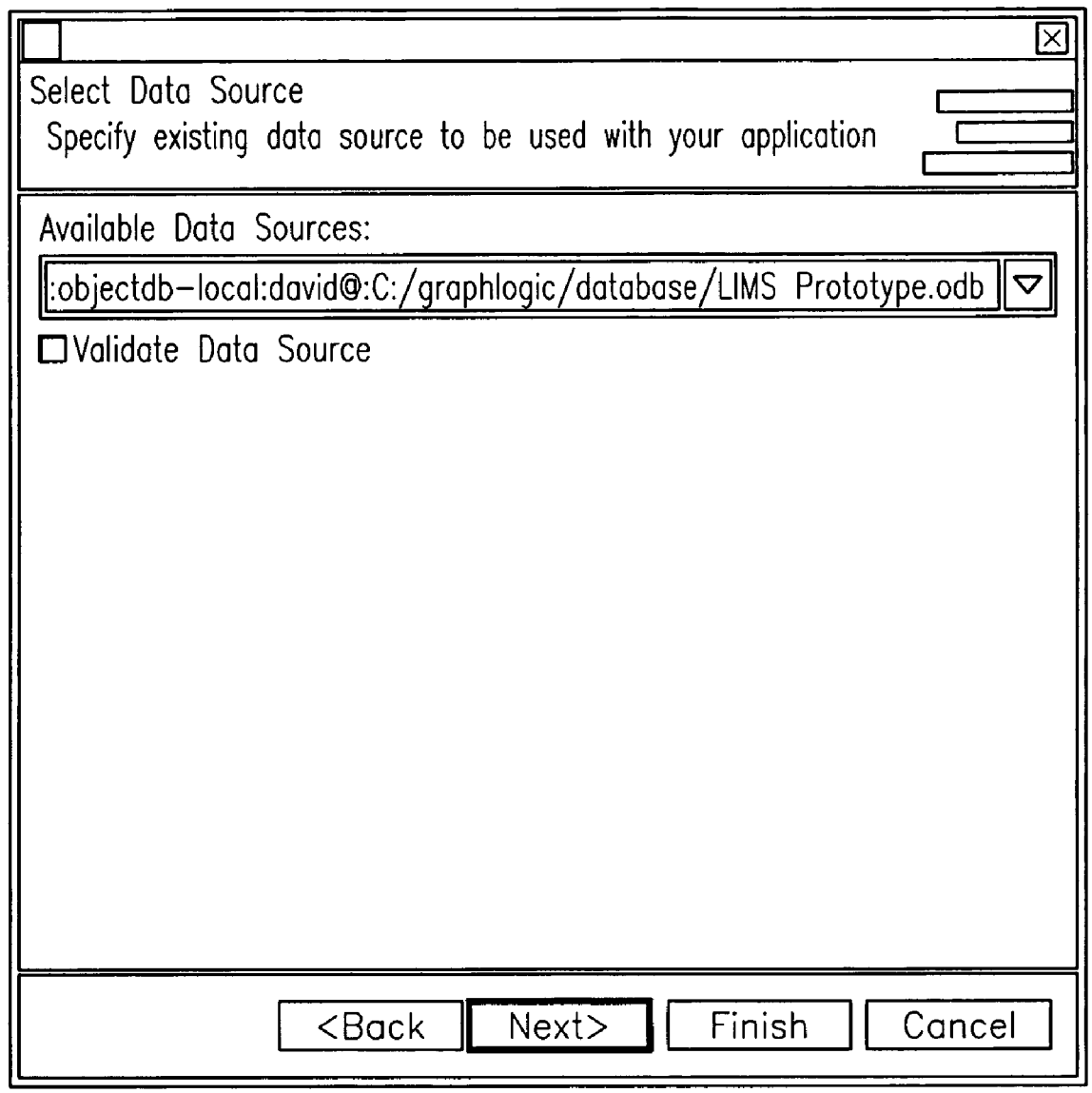
FIG. 6 is an application definition wizard window for repository selection according to exemplary embodiments of the present invention.
Figure 7:
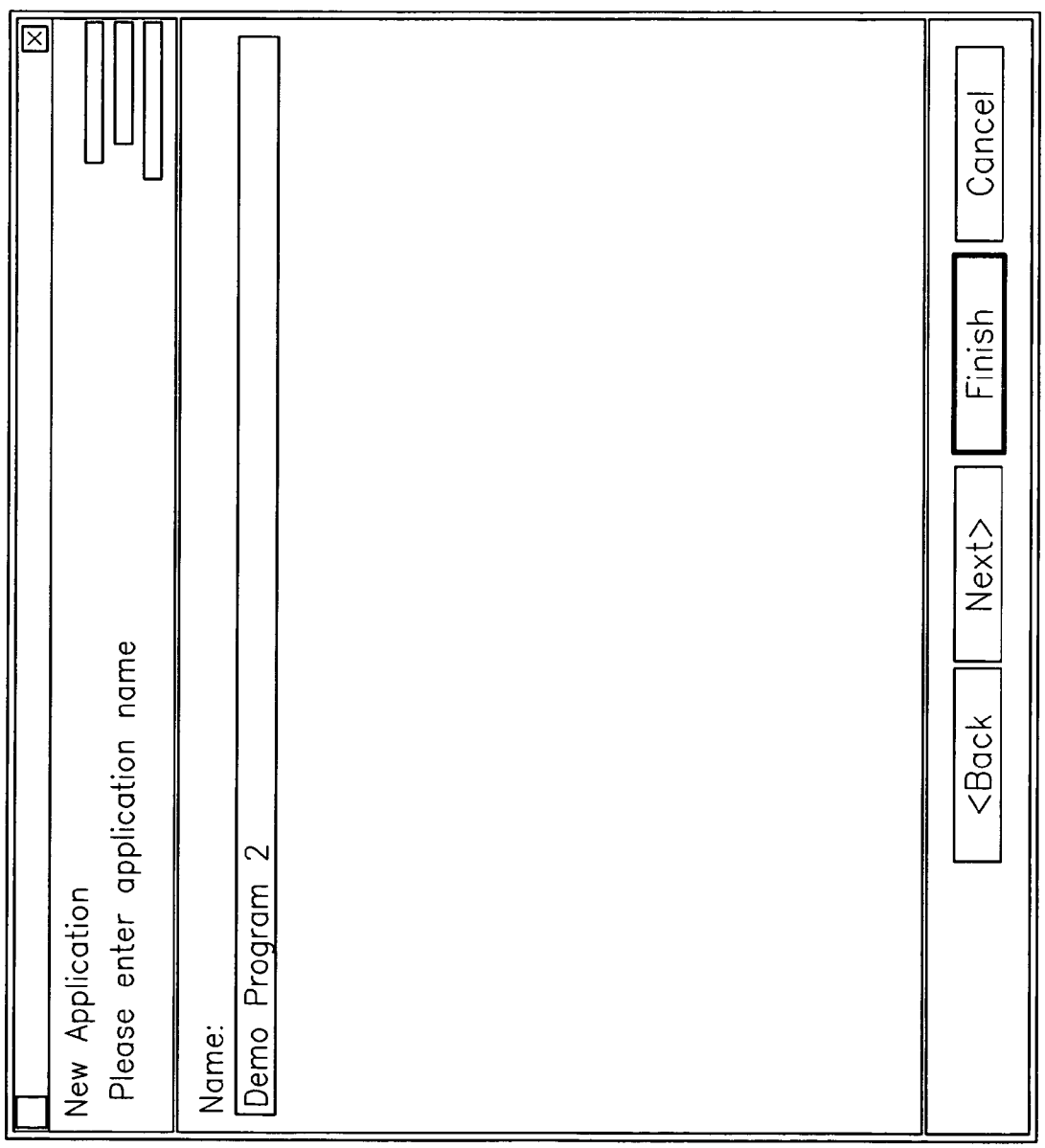
FIG. 7 is an application definition wizard window for application name entry according to exemplary embodiments of the present invention.

The following is a list of editing functions provided by an exemplary embodiment of the OPGAE 2 component of the present invention:

Defining an application—the process of defining a new application is controlled by the application definition wizard. The application definition wizard starts when the new application icon on the OPGAE tool bar is clicked. The application definition wizard first displays a repository selection window, such as the one depicted in FIG. 6. After a repository in which to store the new application is selected, the application definition wizard displays an application name entry window, such as the one depicted in FIG. 7. After the application name is entered, the application definition wizard displays an application definition window that enables a user to provide application descriptive information, e.g. who the user is and a password to control access to editing functions. Finally, the application definition wizard causes the OPGAE 2 to display the new application as an OPG component in a component view 9, such as the one depicted in FIG. 4, which provides a canvas for defining the application. The application navigator view 6 will show the application as the top most entry in its application tree (e.g., "Demo Program" in FIG. 4).

Opening an application—the process of opening an existing application is controlled by the application definition wizard. The application definition wizard starts when the open application icon on the OPGAE tool bar is clicked. The application definition wizard displays a repository selection window, such as the one depicted in FIG. 6 and when the next button is clicked, it displays a list of applications from which to select.

Defining a process component and adding it to an application component—with the application displayed as the active component view 9, the operation selection is made on the palette view 11, and an operation is placed on the application's composition canvas 14. The placed process becomes a child of the application. Every application has a set of child processes. Additional processes can be added to an application with the same procedure. The name of the process can be changed by clicking on its name and entering a new name directly on the process component.

Defining an operation component and adding it to a process component—after making the operation selection on the palette view 11, an operation can be placed on the composition canvas 14 of any process displayed on the active component view 9. The placed operation becomes a child of the process on which it was placed. Every process has a set of child operations.

Defining a data structure component and adding it to an operation component—after making the data structure selection on the palette view 11, a data structure can be placed on the composition canvas 14 of any operation displayed on the active component view 9.

Defining a data structure component and adding it to a data structure component—after making the data structure selection on the palette view 11, a data structure array can be placed on the composition canvas 14 of any data structure displayed on the active component view 9. When a data structure array is placed on the composition canvas 14 of a data structure, it becomes an attribute of the data structure on which it is placed.

Defining a data structure array component and adding it to a data structure component—after making the data structure array selection on the palette view 11, the primitive data can be placed on the composition canvas 14 of any data structure displayed on the active component view 9. When a data structure array is placed on the composition canvas 14 of a data structure, it becomes an attribute of the data structure on which it is placed.

Defining a primitive data component and adding it to a data structure component or a data structure array component—after making the primitive data selection on the palette view 11, a primitive data can be placed on the composition canvas 14 of any data structure or data structure array displayed on the active component view 9. When primitive data are placed on the composition canvas 14 of a data structure, they become an attribute of the data structure on which it is placed.

Deleting a component from an OPG application—after selecting the component to be deleted, press the delete key on the keyboard or select delete on the context menu.

Defining and adding a link between two components—after making the link selection on the palette view 11, click on the 'from' component on the active composition view 9 and then click on the 'to' component. The OPGAE 2 will place a line connecting the two components from a connection point 16 on the 'from' component to a connection point on the 'to' component. The ends of the link can be moved to a different connection point 16 if desired. The link placed by the OPGAE 2 will be of the appropriate category for the 'from' and 'to' components, i.e. a process-to-process, process-to-data or data-to-data link. The connection type can be changed by clicking on the link to select it and then changing the type property on the component properties view 7.

OPGAE Design Description

Figure 8:
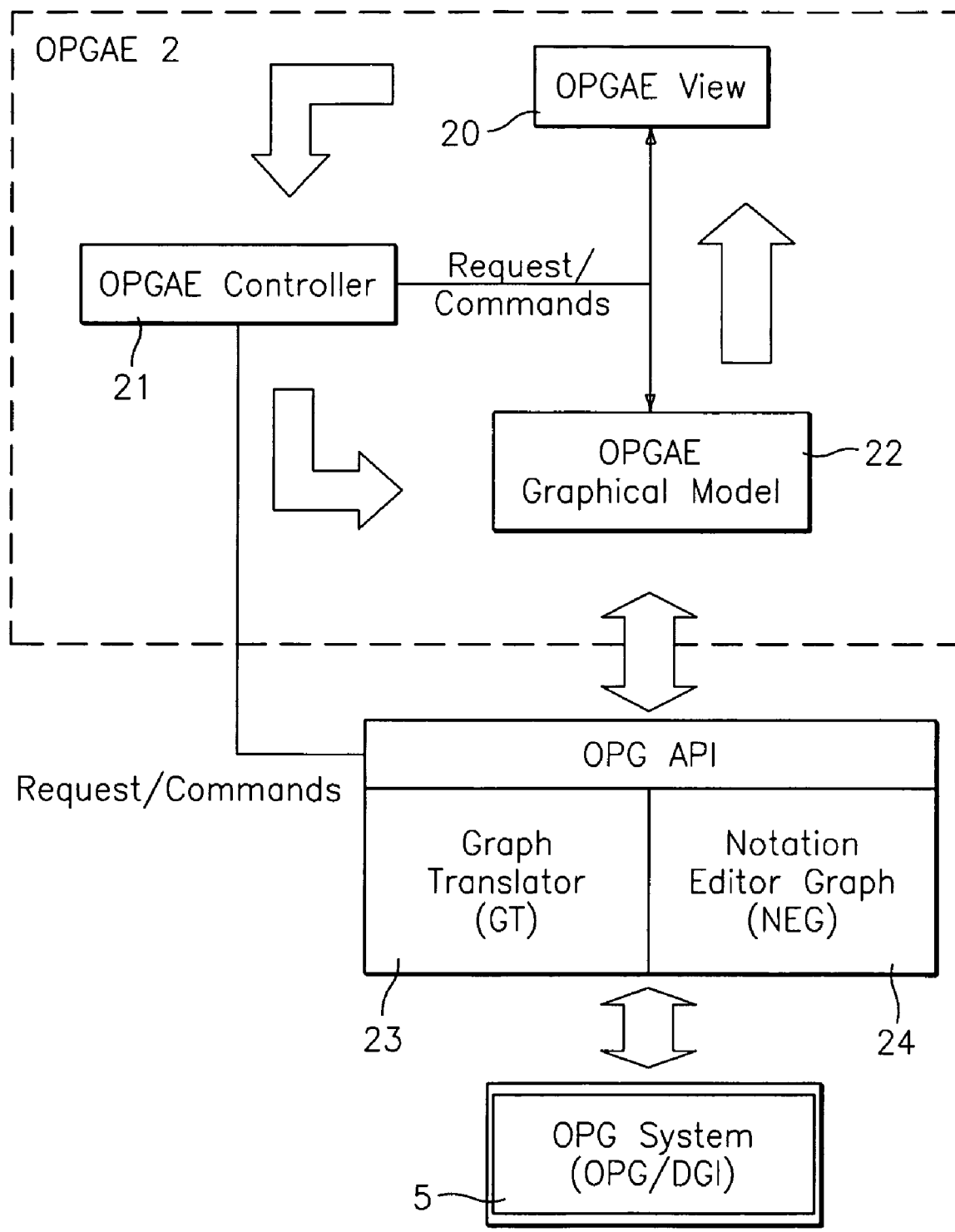
FIG. 8 is an OPGAE according to exemplary embodiments of the present invention.

In exemplary embodiments, the OPGAE 2 is implemented as an Eclipse platform plug-in and is based on the classic Model View Controller (MVC) framework as depicted in FIG. 8. The OPGAPI graph translator (GT) 23 translates an OPG application from an OPG system 5 into a notation editor graph (NEG) 24 (this translation is described below as part of the OPGAPI 3 description contained herein). The OPGAE controller 21 converts the NEG 24 into an OPGAE graphical model 22 that the OPGAE view 20 and OPGAE controller 21 components interact with to render an OPG application and/or parts of an OPG application on a display medium. In exemplary embodiments, the OPGAE view 20 and OPGAE controller 21 are based on the Eclipse GEF. The OPGAE graphical model 22 also enables the OPGAE controller 21 to validate user inputs and dynamically determine the options available to the user.

The OPGAE view 20 component renders the graphical model of an OPG application as a diagram (e.g., an arrangement of graphical symbols and controls) on a display medium. The OPGAE view 20 can display a complete OPG application as a set of related top-level elements that can be recursively decomposed into their constituent parts. When the OPGAE controller 21 is notified that the user has chosen to examine an application element in more detail via one of the graphical controls, it requests the OPGAE view 20 to render the selected part of the model. In this way, a user can navigate a displayed OPG application or parts of an application to any desired level of detail.

In addition to directing the OPGAE view 20 component to render all or a part of an OPG application on a display medium and converting the NEG to a graphical model, the OPGAE controller 21 component is responsible for processing user inputs and selections. In exemplary embodiments, user requests include creating or deleting application elements, such as operations and data arrays or changing the relationships between application elements. Users may also add or remove attributes of composite data nodes and update the properties of any application entity. The OPGAE controller interacts with an OPG application via the functions of the graphical model presented by the OPGAE model.

Object Process Graph Application Program Window Editor (OPGAWE)—Functional Overview This section provides a functional overview of the OPGAWE 4. The referenced figures, FIGS. 9-14, are window images showing how data display windows and display properties on an OPG application can be edited as part of defining an application or as the program is actually running.

Figure 9:
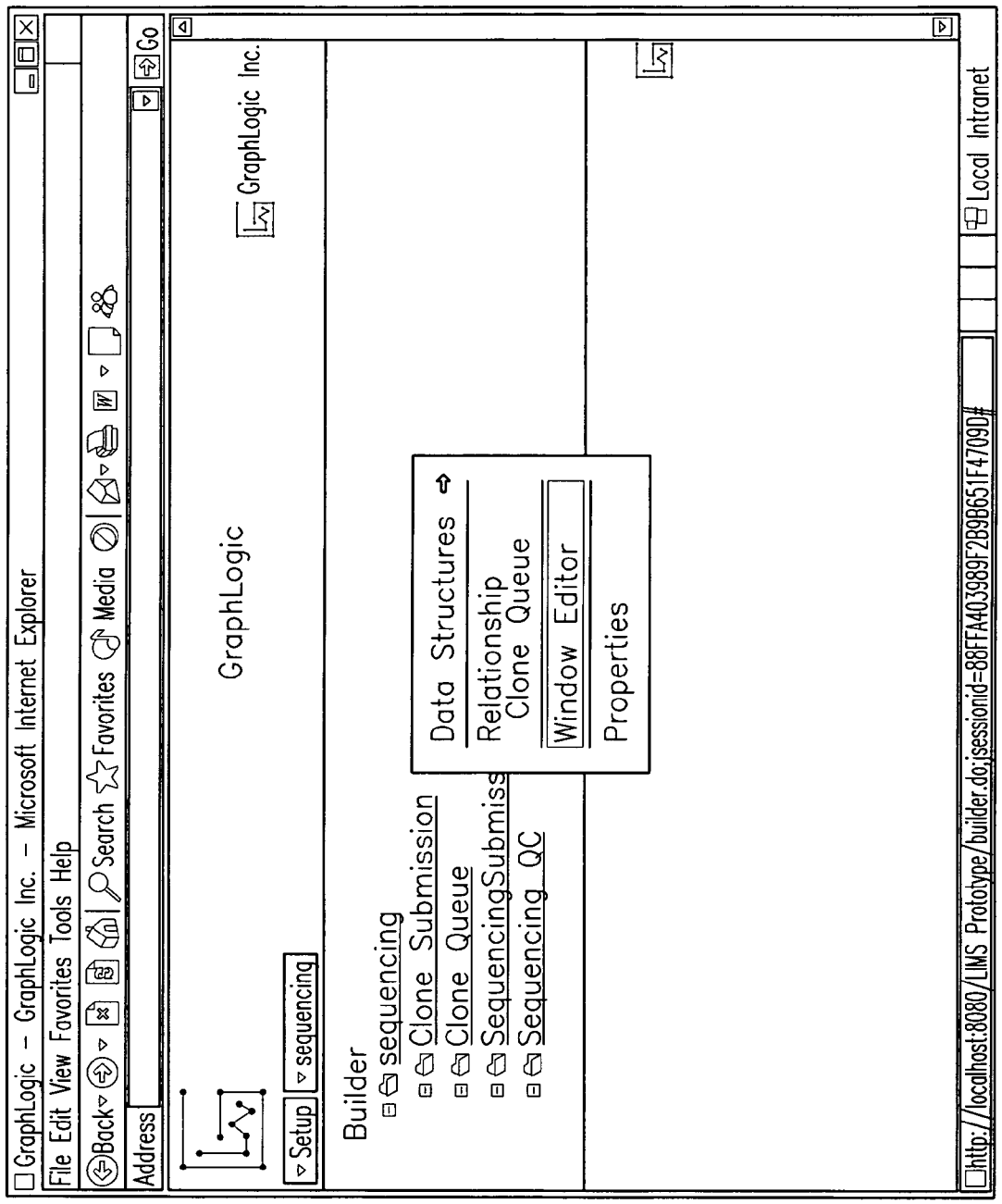
FIG. 9 depicts selecting the OPG Application Window Editor (OPGAWE) from the builder according to exemplary embodiments of the present invention.
Figure 10:
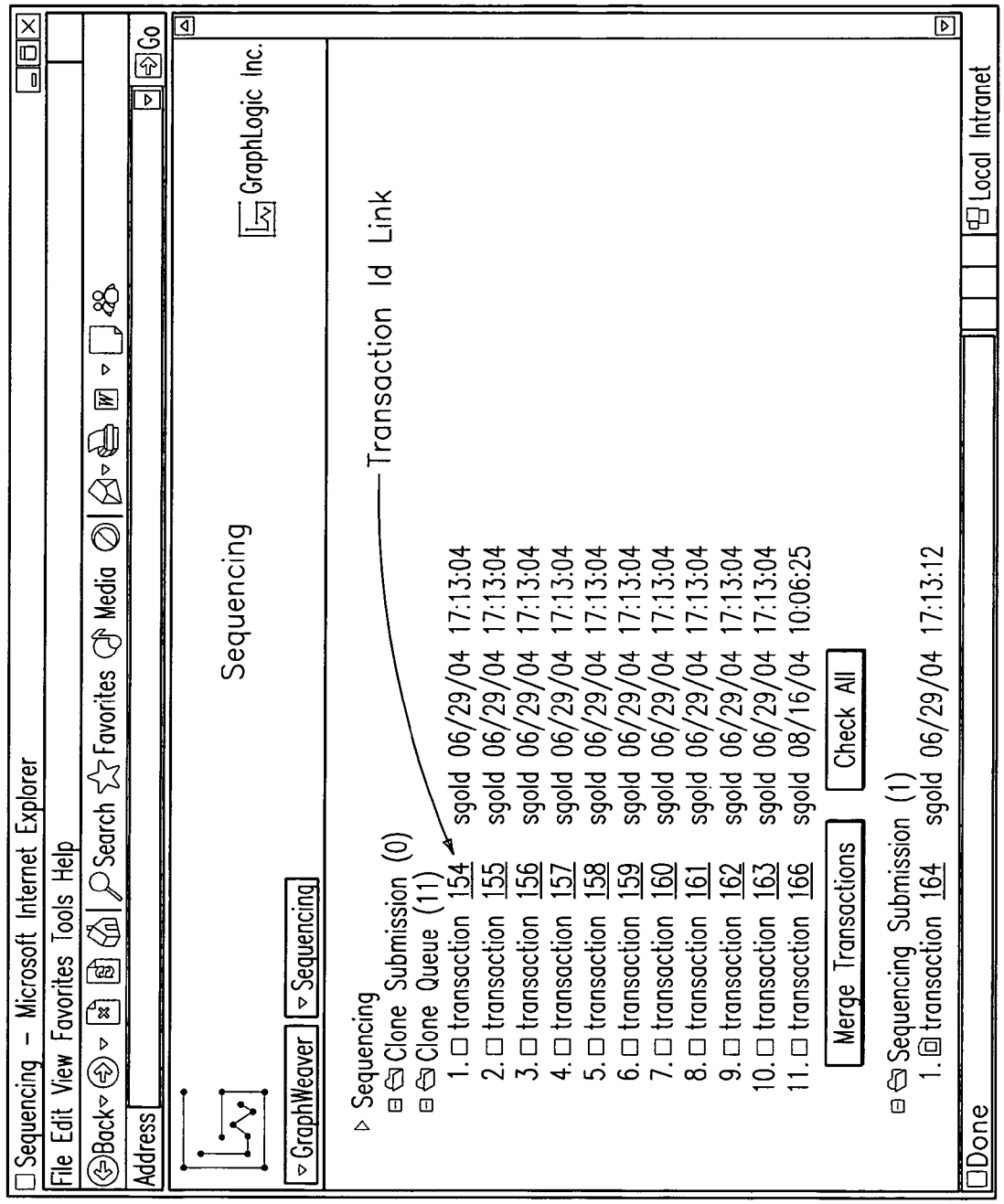
FIG. 10 depicts selecting an operation window from the OPG default application display window according to exemplary embodiments of the present invention.

The OPGAWE 4 provides a WYSIWYG style editor. In exemplary embodiments, such as the one depicted in FIG. 9, the editor is initiated from the 'Builder' window of the OPG system 5. In addition, or alternatively, as depicted in FIG. 10, the editor is initiated from a running OPG application window. When the editor is initiated from the builder window in an OPG system 5, an application operation is selected. The "window editor" menu item, such as the one depicted in FIG. 9 is used to select the OPGAWE 4. Changes made to window and data display properties when the OPGAWE 4 is initiated in this way will apply to the data of all transactions subsequently processed by the associated application operation.

When the editor is initiated from a running application, a transaction at an application operation on the OPG system application display window is selected first (see for e.g., the transaction identifier link in FIG. 10). This causes the OPG system 5 to display an application window with transaction data at its current operation. See for example, FIG. 11, where the data displayed on the window is formatted according to the current window formatting properties. The current window formatting properties potentially have three different sources. The first source of window formatting properties is the application or default data display properties for the data that is part of a transaction at the active operation. This is the lowest precedence source of properties. The second source of window formatting properties is the operation specific display properties that only apply to the transaction data at the selected operation. This is the next highest precedence source of properties, which override the application properties. The third source of window formatting properties is the transaction specific display properties that only apply to the data of the selected transaction at the active operation. The OPGAWE 4 may be utilized to edit the window and data display formatting properties of any one of these sets of properties.

In exemplary embodiments, the OPGAWE 4 is initiated from an application data display window by selecting one of the property sources on the window editor drop down list, which is a control on the application data display window. See FIG. 12 for an exemplary embodiment of a user interface for initiating the window editor from an operation data display window.

Figure 13:
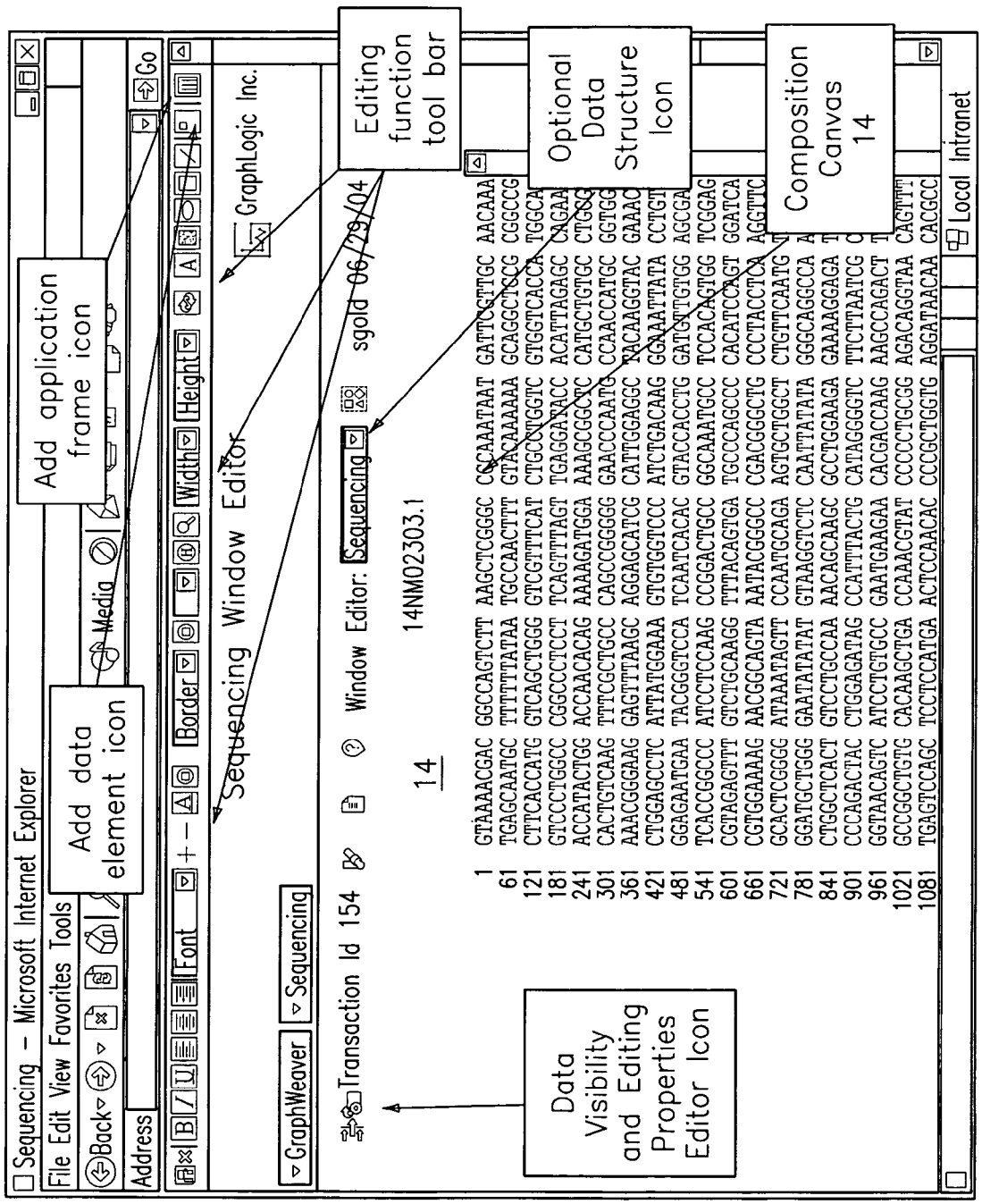
FIG. 13 is an OPG operation data window editor according to exemplary embodiments of the present invention.

In exemplary embodiments, such as the one depicted in FIG. 13, the OPGAWE 4 displays an editing function tool bar above a composition canvas 14 for the window. The window in the composition canvas 14 will display the window using the selected source of window and data display properties. The tool bar provides many of the functions typically provided by traditional window editors and they function in a similar fashion. During an editing session, data display entities are selected and one or more of the tool bar functions can be applied to them by clicking on a tool bar icon. For example, the text displayed in a field can be made larger by selecting a larger font or, it can be italicized. Data display entities can also be moved around on the window and/or hidden from view as desired.

Exemplary embodiments of the OPGAWE tool bar also provide simple graphical elements, e.g. lines, boxes, circles, and labels that can be placed on a window and then resized as desired. Text can be typed into labels as required.

Additional persistent data items and their associated display fields can be added to a window and its application by clicking on the data element icon on the extreme right of the tool bar. Data items can be simple data input fields, images or links to files, such as spreadsheets or word processor documents. Data items or links added to a window in this manner become a persistent part of the application.

Figure 14:
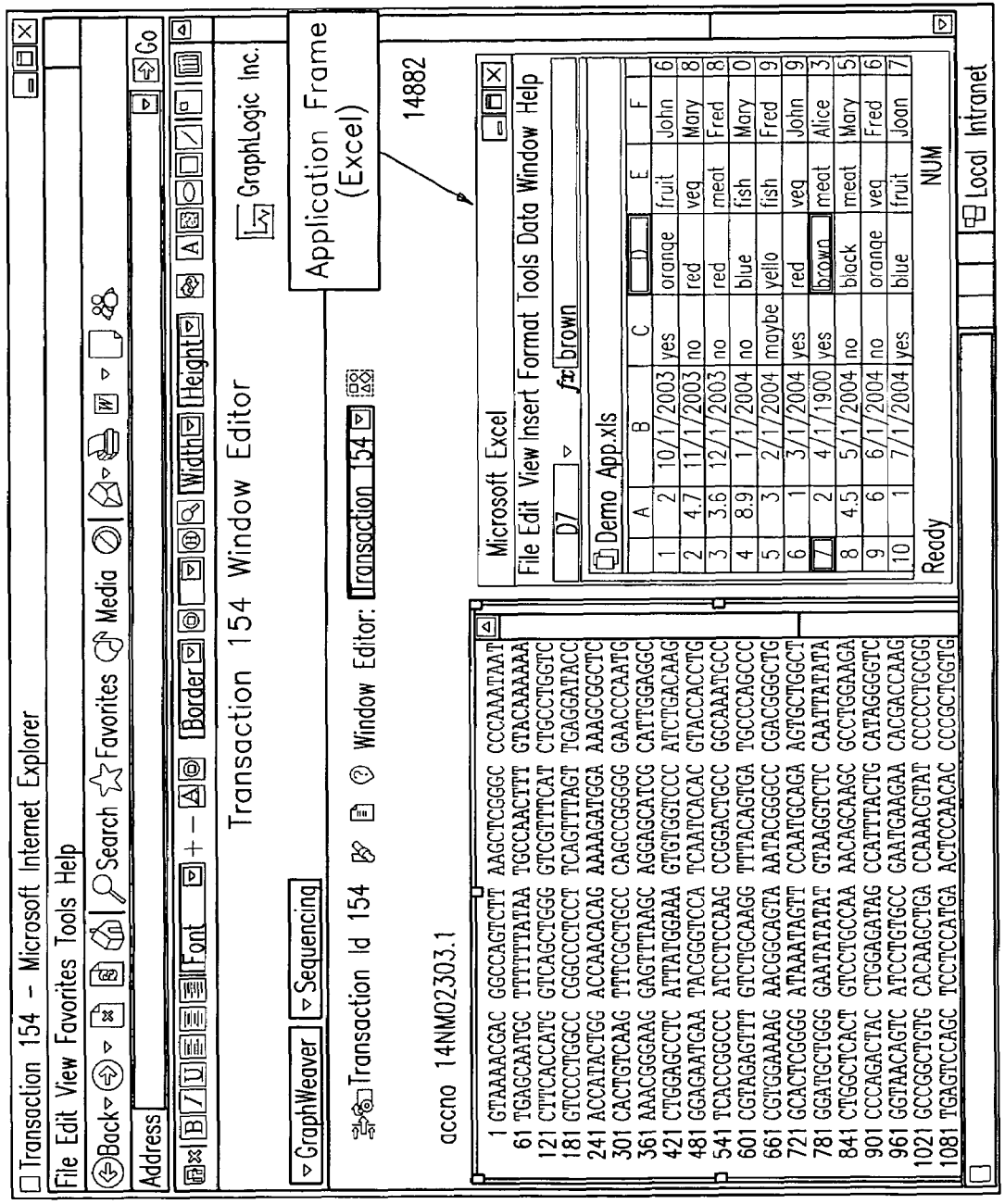
FIG. 14 depicts adding an application frame to an OPG application window according to exemplary embodiments of the present invention.

Application frames can also be added to a window by clicking on the application frame icon at the extreme right of the tool bar and selecting a file type property. Application frames provide a way of working with an application within the context of an OPG application. For example, as depicted in FIG. 14, a spreadsheet can be loaded into the OPG system 5 and displayed within a frame on an application window. A user can then make changes to the data in the spreadsheet and save them in the OPG database. The user can choose to save the updated spreadsheet back to its original location in the host system's file system. When an application frame is added to a window, the application must be available on the workstation. The workstation requires a browser to start the application.

When window and data display property editing is completed, the changes are saved by clicking on the floppy disk icon, which is on the extreme left of the tool bar.

OPGAWE Description

Figure 15:
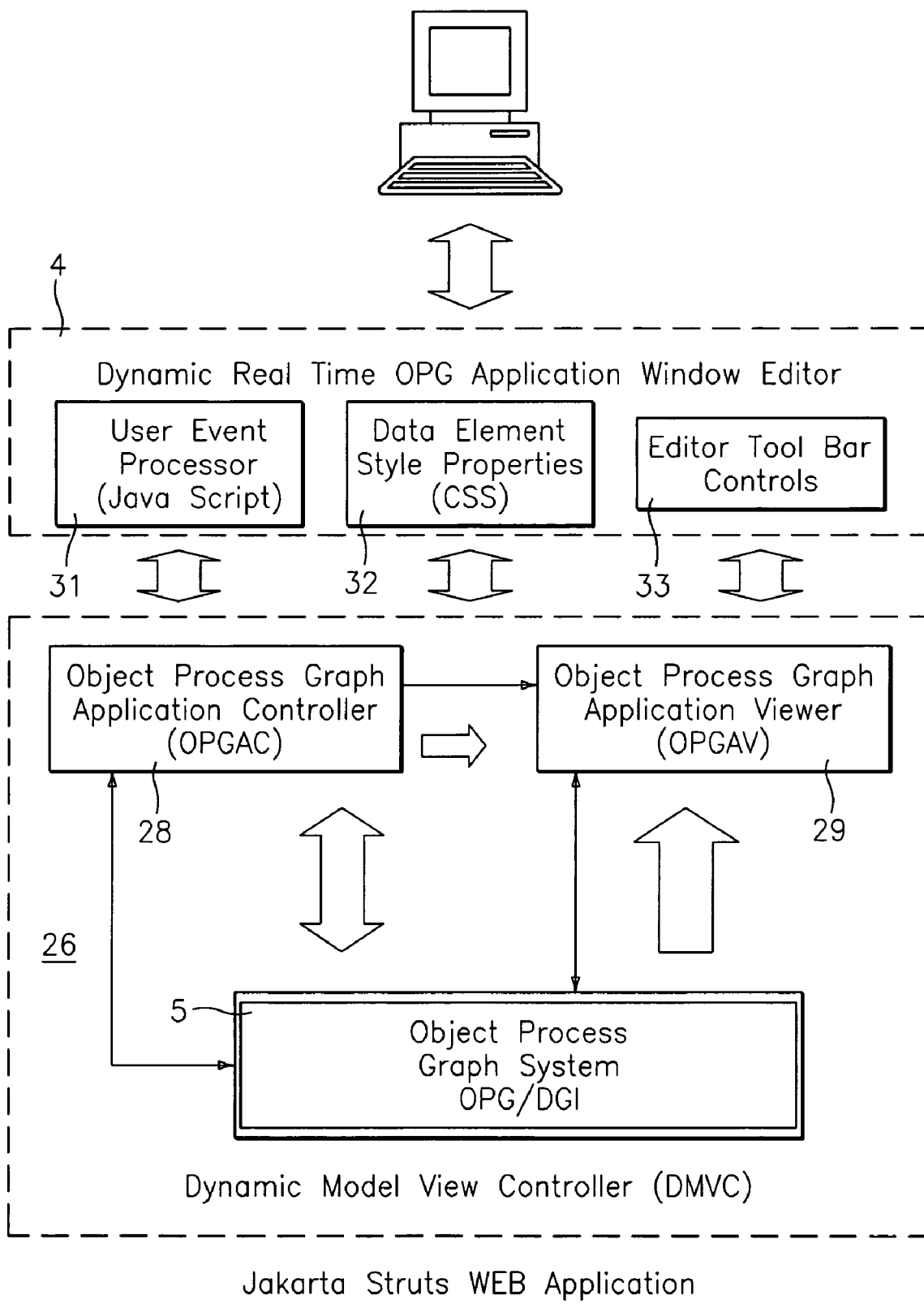
FIG. 15 is an extended dynamic model view controller according to exemplary embodiments of the present invention.

Exemplary embodiments of the present invention, such as the one depicted in FIG. 15, function as a component of a Dynamic Model View Controller (DMVC) 26. A DMVC 26 is an application structure formed by integrating an OPG Application Controller (OPGAC) 28 and an Object Process Graph Application Viewer (OPGAV) 29 with an OPG system (Object Process Graph (OPG) and Dynamic Graph Interpreter (DGI.)) 26. This dynamic application structure manifests running instances of OPG applications. Dynamic Graph Interpreter (DGI) is described subsequently herein. The OPGAC 28 controls the running of applications by: processing input data, instructions/selections from users or other systems; initiating the display or output of information via the OPGAV 29, commanding the DGI 27 to initiate application state transitions and controlling the import and export of OPG application descriptions. The OPGAC 28 is the controller component of the DMVC 26.

The OPGAV 29 is the view component of the DMVC 26. It receives display/output commands from the OPGAC 28 to render application OPGs on a display media and/or output devices. The rendered OPGs provide a means of interacting with the applications via selection and input controls. They also display application state objects in their appropriate context and provide a way to view and update their content.

Another element of the DMVC 26, the OPG system 27, functions as the model component. It is integrated with the OPGAC 28 and OPGAV 29. The OPG defines an application's complex processing steps and data and provides storage for an application's persistent and transient data. The DGI provides the functions invoked by the OPGAC 28 and OPGAV 29 to run an OPG-defined application.

One exemplary embodiment of the invention (FIG. 1) integrates the OPGAC 28 and OPGAV 29 with the OPG system 27 to form a Dynamic Model View Controller (DMVC) 5 application structure based on the Jakarta Struts WEB application framework. The DMVC 26 is capable of providing a display on a computing device, such as a personal computer (PC). Other technologies incorporated in this exemplary embodiment include Cascading Style Sheets (CSS), Dynamic HTML (DHTM), Java Document Model (JDOM), Java Server Pages (JSPs), Struts Tiles, etc. Of course, other embodiments may be implemented with various other application frameworks and technologies.

In this exemplary embodiment, the OPGAC 28 control functions are implemented with Struts-based Action and Form classes. The Action classes interpret user selections, instructions and input data and interact with and command the DGI 27 to update application state objects, perform state validations. Also, based on application state objects and process control objects in an application's OPG, the OPGAC 28 instructs the DGI to associate the application state with the next active operations. Performing these functions is similar to running a traditional software application. The Form classes implement standard Java Bean interface access to OPG data objects and provide access to user input data for evaluation by the OPGAC 2.

The OPGAWE 4 specializes the application session transaction control flow of the DMVC 26, making it possible for users to modify the data display properties of an OPG application window and make the changes persistent. From the point of view of the OPG system 5, which functions as the model component of the DMVC 26, storing display properties is the same as storing any other data properties. The technologies incorporated in this exemplary embodiment include: the Jakarta Struts WEB application framework, cascading style sheets (CSS), dynamic hyper text markup language (DHTML), Java Document Model (JDOM), Java server pages (JSPs), and struts tiles.

The OPGAWE 4 extends both the controller component OPGAC 28 and the view component OPGAV 29 of the DMVC 26. The OPGAC 28 is extended in two ways. First, functions were added to the OPGAC 28 to respond to requests to activate the OPGAWE 4, as described above, from either a builder window or a running application's window. When the OPGAC 28 receives a request for the OPGAWE 4, it instructs the OPGAV 29 to create the dynamic real time OPGAWE 4 and to transmit it to the user's Internet browser. In exemplary embodiments, the OPGAWE 4 is a JSP that combines the user event processor 31 written in JavaScript, the application window data elements, or data element style properties 32 encoded as CSSs and the OPGAWE 4 tool bar controls 33. The JSP is compiled into a DHTML page and sent to the user's browser by the Internet application server. The other extension to the OPGAC 28 is the user event processor 31 component of the OPGAWE 4. The user event processor 31 is a logical extension to the OPGAC 28 in that it is not a direct component of the OPGAC 28 and it is executed on the user's PC or other end-user computing device. The user event processor 31 is a collection of functions that respond to user events, such as mouse clicks and mouse movements, which are detected by the user's Internet browser and makes changes to the definitions in the data element style properties 32.

The OPGAV 29 is also extended in two ways. First, the special OPGAWE 4 JSP is included in the OPGAV 29. Second, the data element style properties 32 encoded as CSSs and the editor tool bar controls 33, which are components of the OPGAWE 4, are logical extensions of the OPGAV 29 since they perform view functions and execute on the user's PC.

Figure 16:
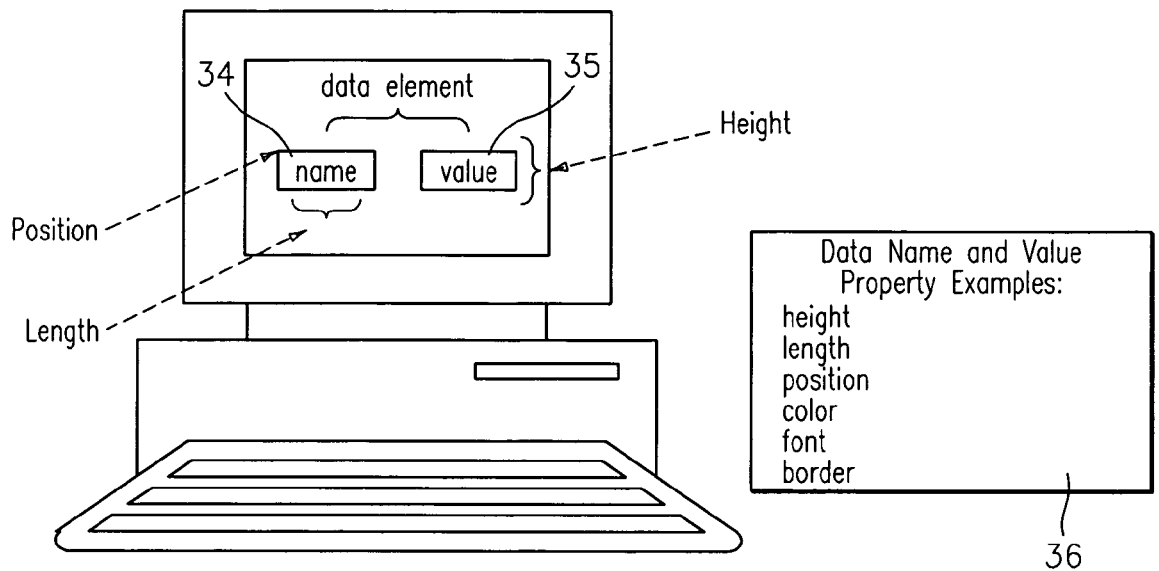
FIG. 16 depicts application data display properties according to exemplary embodiments of the present invention.
Figure 16:
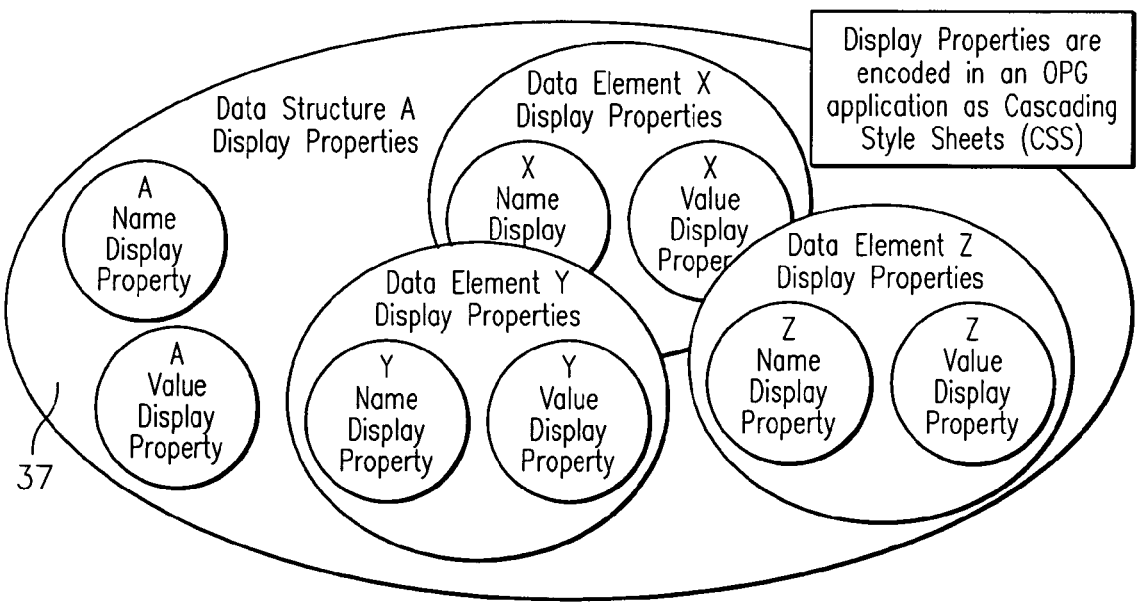

FIG. 16 depicts exemplary application data display properties that may be defined for every data element (complex or elementary) displayed on an OPG application window. Each data element has two components: name 34 and value 35 (the exemplary embodiment depicted in FIG. 17 also identifies the components of a data element on an OPGAWE window) and each component has a set of display properties encoded as a CSS strings. Examples of display properties 36 include: height, length, position, color and font.

Display properties 36 are part of the persistent data definitions in an application's OPG 37. In exemplary embodiments there are three sets of these properties: application, operation and transaction, which are synthesized by the DGI into one set for use by the OPGAV 29. The DGI 6 provides display properties 38 and security constraints 39 stored in the OPG application state data instances 37 for every primitive data element. Primitive data display properties include the position on a display where an element will be rendered, the length and height of the element, etc. Security constraints include whether or not an element should be displayed or whether or not it can be edited, etc.

Display and security properties can be defined at three levels: Application, Operation and Application Instance, in this exemplary embodiment. Application Instance properties have the highest priority. If present, they supersede Application and Operation properties. Operation properties have the next highest priority. If present, they supersede Application properties. Application Instance properties apply to application data for a single instance of running an application. Operation properties apply to all instances of running an application but just within the context of a particular Operation. Application properties 43 apply within the context of an application, i.e. to all instances of an application. The Display and Security Property Synthesis function determines which properties to use based on the current state (context) of an application instance.

A user may add optional data elements or graphics, e.g. lines and boxes, to OPG applications. The OPG system 5 provides an optional data structure for each window where such elements can be made persistent. These optional elements can be edited in the same way that predefined OPG application window elements are edited.

Figure 17:
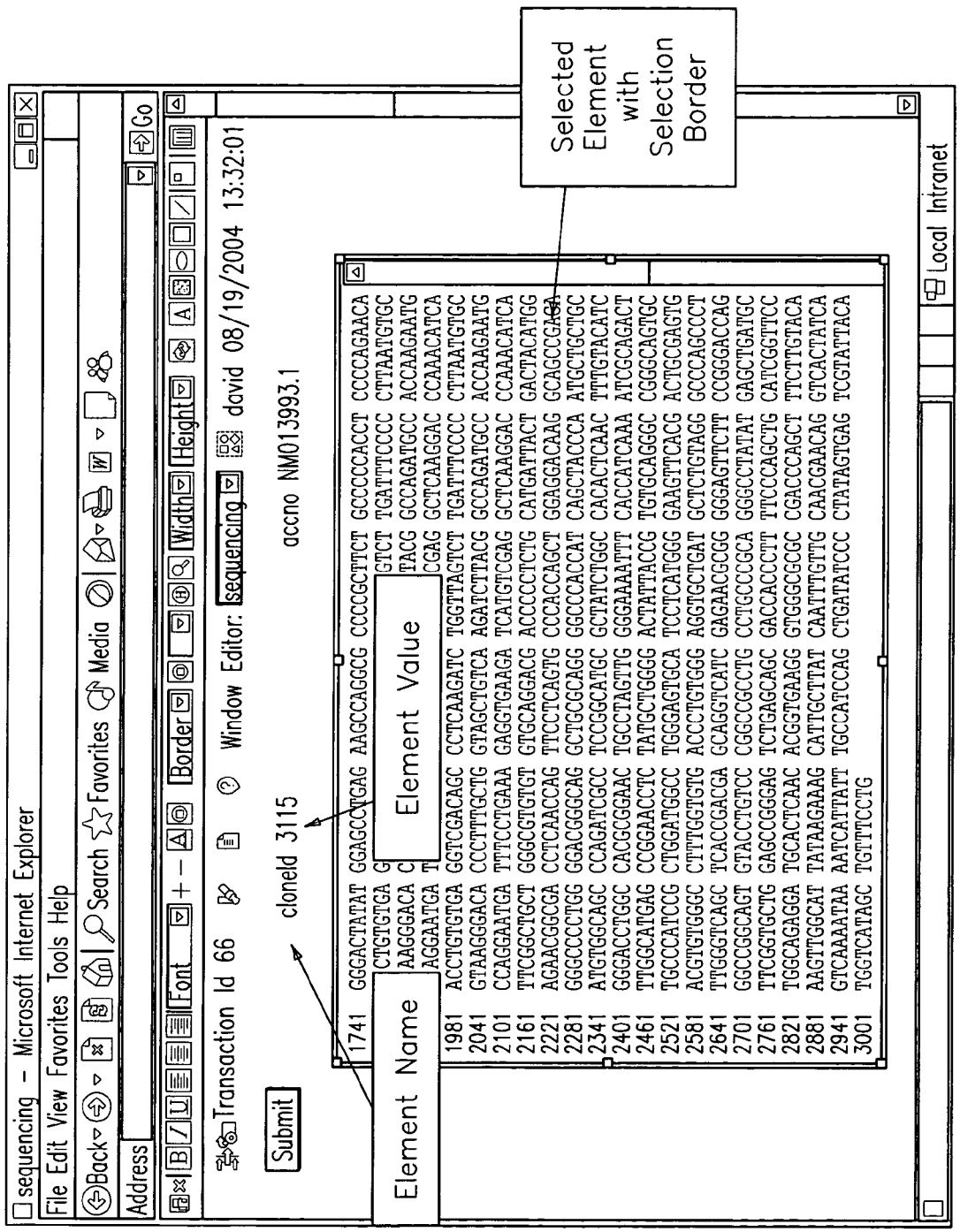
FIG. 17 depicts a selected element on the OPGAWE according to exemplary embodiments of the present invention.

When a user edits an OPG application window, such as the one depicted in FIG. 16, the changes are processed and displayed immediately in real time. User actions, such as mouse clicks, moving the mouse while holding the left button down, or clicking on a control element of the editor tool bar controls 33 such as the color pull down are received by the user's Internet browser as user events. The browser then invokes the appropriate function(s) of the user event processor 31 to handle the event. The user event processor 31 interprets the event in the context of the user's session, i.e. what the user has already done. For example, if the user clicks on a data element name or value component, the user event processor 31 will interpret the event as a component selection. In response to the selection, the user event processor 31 will change values in the CSS of the selected component such that the selection border will be erased, and change values in the newly selected element's CSS such that its selection border is shown, and it will save a pointer to the selected element. The exemplary embodiment depicted in FIG. 17 depicts the data value element selected. Once an element is selected, editing functions on the tool bar or resizing or moving actions can then be applied to that particular element. The processing of editing functions follows a common pattern. In each case, the user event processor 31 converts user events to edit request functions and modifies the data element style properties 32, which causes the change to be displayed immediately.

As a user edits an OPG application window's content, the changes remain local to the user's PC until they are made persistent in the OPG application. The user can revert to the window state that was last made persistent at any time, which is essentially an undo function.

Data Visibility and Editing Properties Editor Functions

Figure 11:
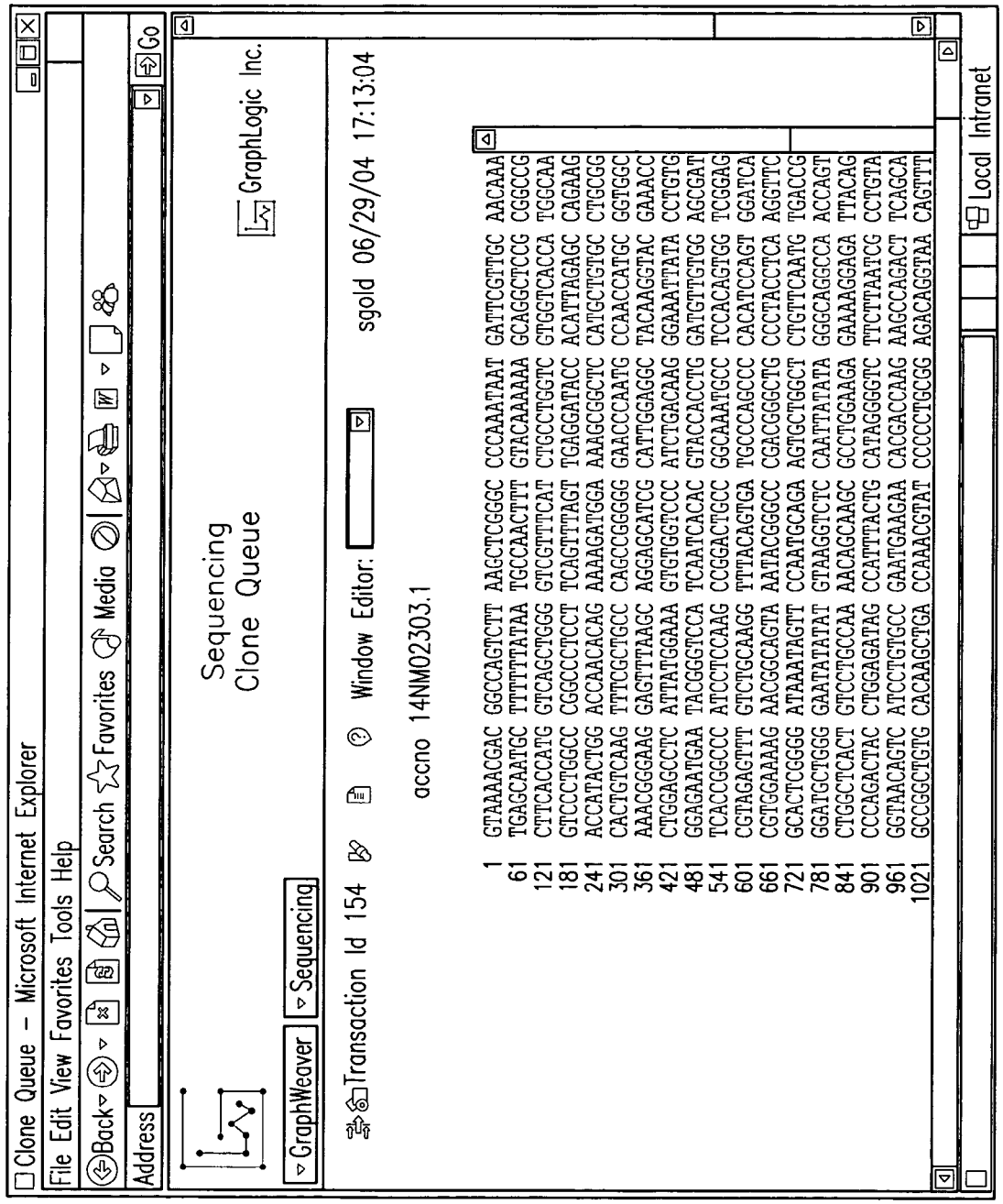
FIG. 11 is an operation data display window according to exemplary embodiments of the present invention.
Figure 12:
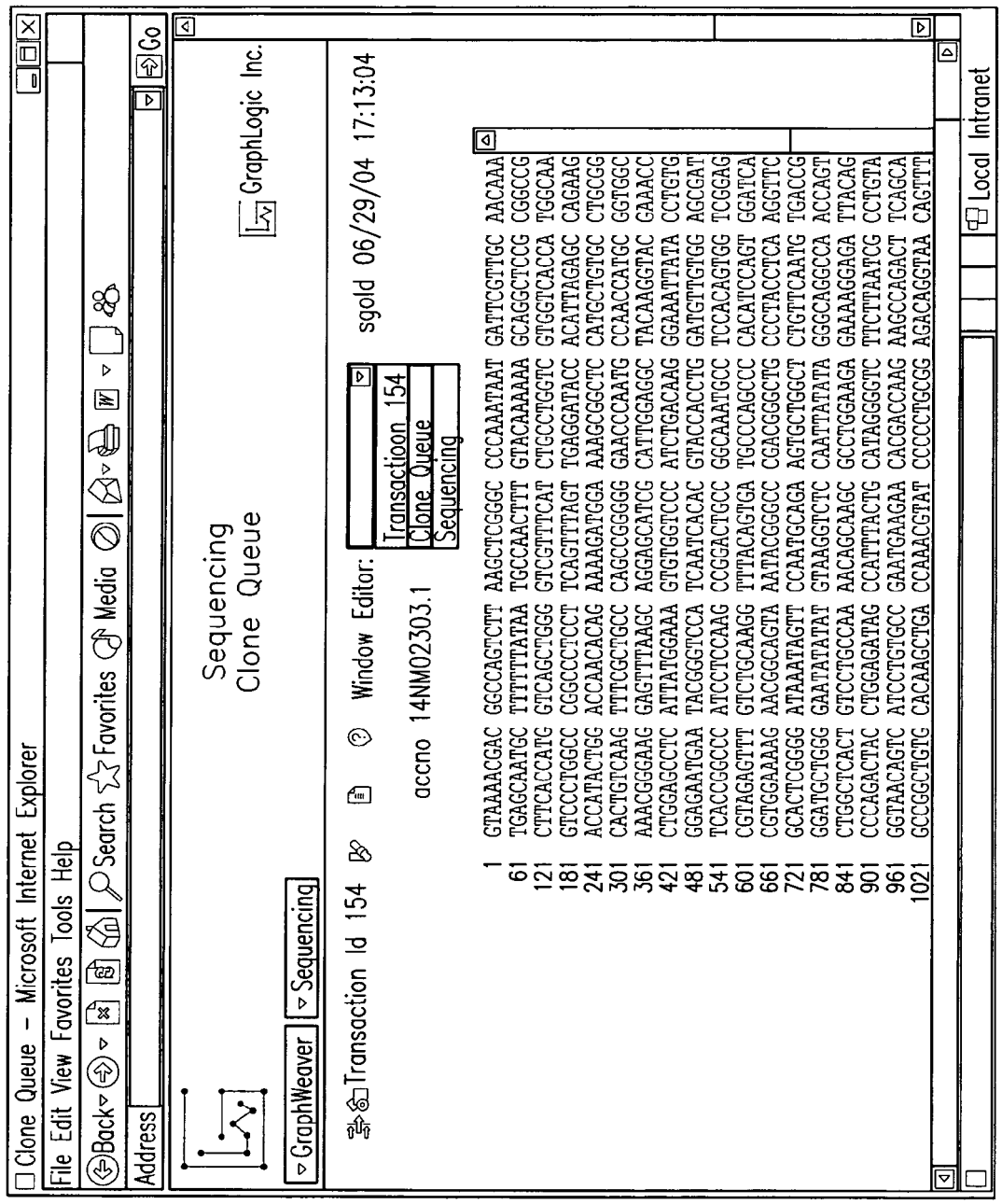
FIG. 12 depicts initiating the OPGAWE from an operation data display window according to exemplary embodiments of the present invention.
Figure 18:
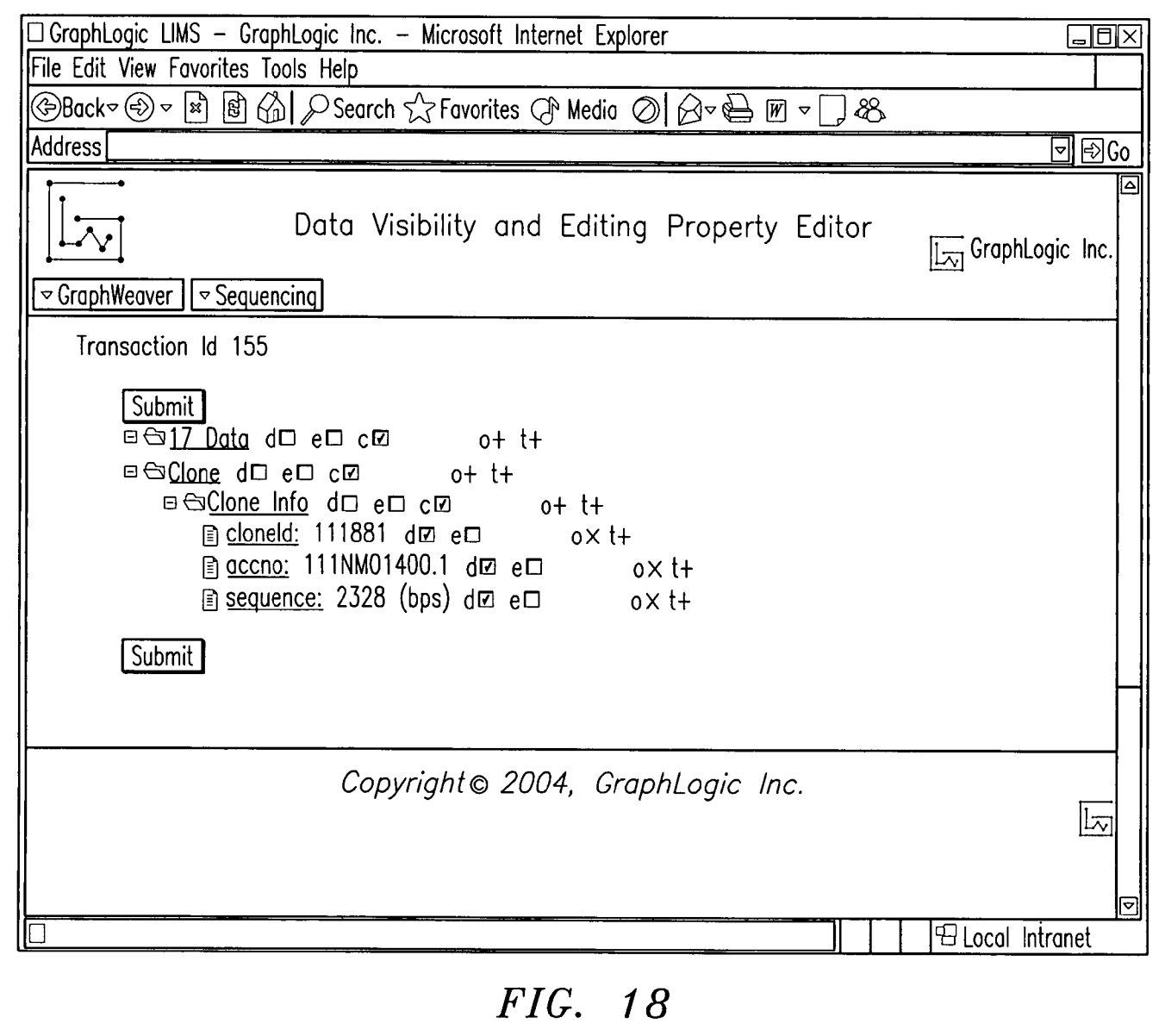

The data visibility and editing properties editor may be accessed from an application display window such as the one depicted in FIG. 11, or via an OPGAWE window such as the one depicted in FIG. 13 via an icon on the far left (identified on FIG. 13). Exemplary embodiments of the data visibility and editing editor, such as the one depicted in FIG. 18, provide a tree style display of the data structures and elements that are part of the transaction's data at the active operation.

Each structure has two sets of selection controls to the right of its name. The first set has three check boxes labeled 'd', 'e' and 'c'. The 'd' box controls whether or not the item will be displayed on the application data display window and OPGAWE window. The 'e' box controls whether or not the item can be edited on the application data display window. The 'c' controls whether or not the child attributes of the item are to be displayed. It only applies to data structures. The second set has two selection icons labeled 'o' and 't'. The selection icons switch from '+' to 'X' when they are clicked. The '+' icon indicates that the item does not apply and the 'X' indicates that it does. The 'o' selection indicates that the data visibility and editing selection in the first set of controls only applies within the selected operation, and the 't' indicates that it only applies to the selected transaction. If neither is checked, it means that the visibility and editing selections apply to the particular data item throughout the application.

Data Visibility Editing Properties Editor Description

Figure 19:
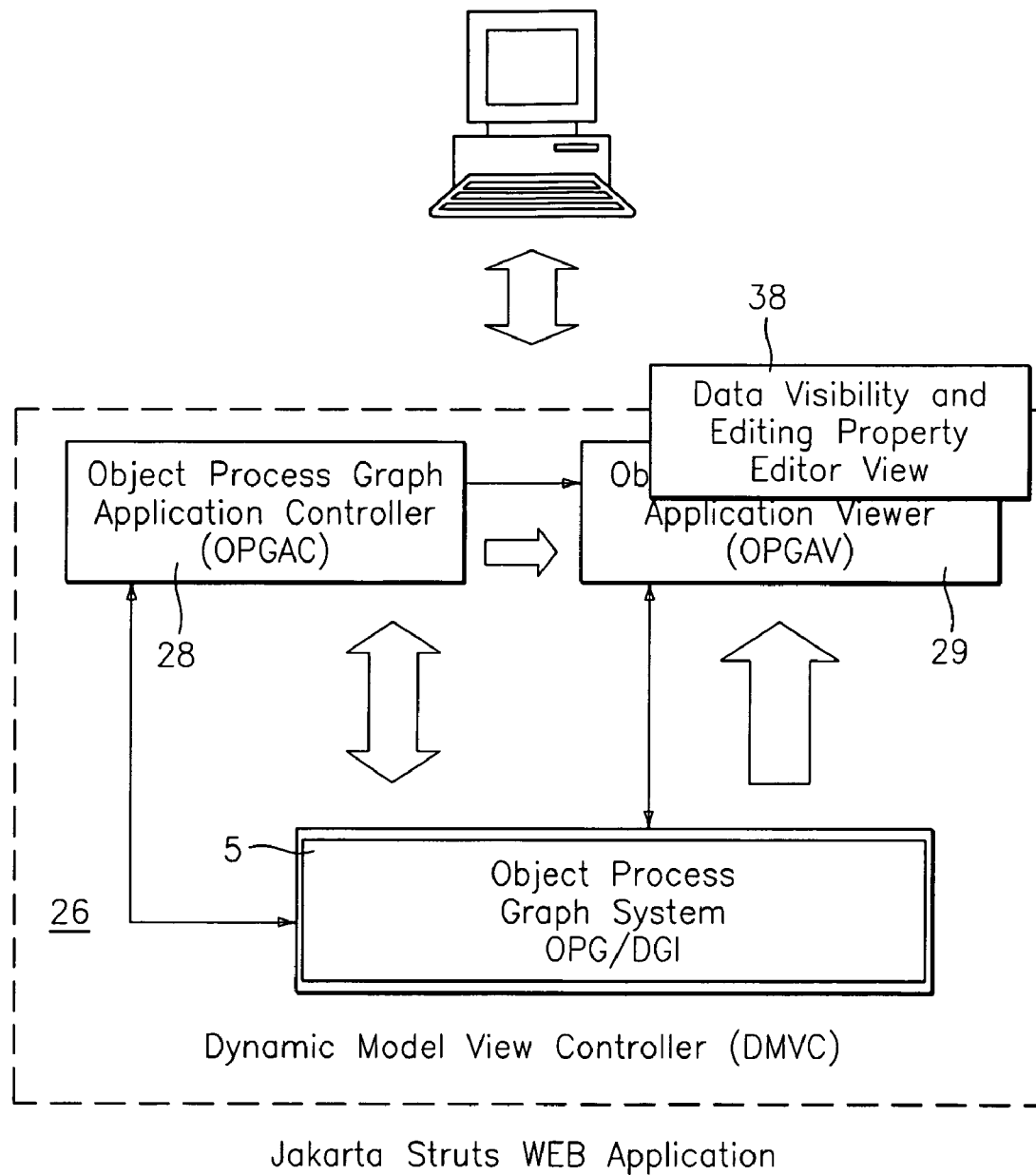
FIG. 19 depicts s data visibility and editing property editor components according to exemplary embodiments of the present invention.

Exemplary embodiments include an instance of the DMVC 26. The editor can be selected from a running OPG application window or the OPGAWE window. As depicted in FIG. 19, the editor includes a data visibility and editing property editor view 38 component, which specializes the OPGAV 29. The visibility and editing properties are boolean properties of their associated data elements in the OPG application. Using the editor, the properties can be changed and made persistent in the OPG application.

The OPGAWE 4 and the data visibility and editing property editor view 38 make it possible for application developers, users and design experts to tailor the visual aspects of an application's data display windows. The editors make it possible to rapidly develop and update an application's user interface during every phase of development to address changing requirements. When the application is actually in use, users and domain experts can change visual aspects of a window and/or add to the data displayed by the application to address specific needs. They can also add data elements to the application's persistent data. Changes can be made so that they apply to all subsequent running of an application or to just one instance of running one component of the application. These run-time editing features extend the applicability of the OPG system 5 to domains where ad hoc changes to data requirements are routine, such as the management of laboratory information. In all domains, users are able to interact with the information systems they use to achieve a higher level of utility.

Object Process Graph Application Program Interface (OPGAPI)

Figure 20:
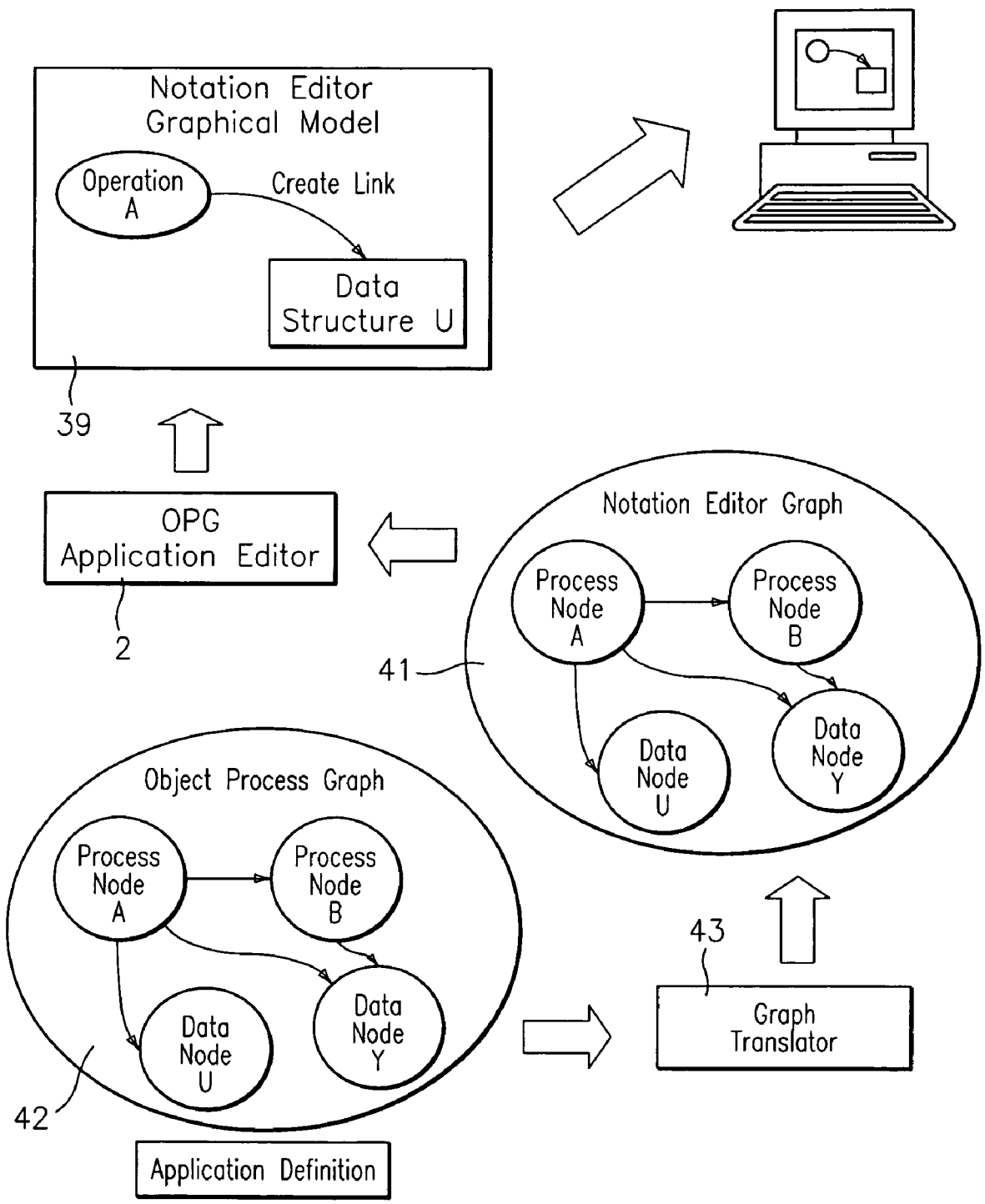
FIG. 20 depicts OPG graph transformations according to exemplary embodiments of the present invention.

In exemplary embodiments, the OPGAPI 3 includes a notation editor graph (NEG) 41 and a graph translator (GT) 43. These components are shown in the context of a complete editing system in FIG. 20. The components are specifically designed to provide the support functions required by the OPGAE 2 described above. Other OPGAPIs for alternative editors based on other notations, such as the Universal Modeling Language (UML), are possible using the same implementation framework described for this embodiment.

The GT 43 and NEG 41 support the editing functions of the OPGAE 2, which is described above. The notation editor graphical model 39 is created by the OPGAE 2. In exemplary embodiments, it contains the graphical software elements required to render a graphical representation of an OPG application on the user's monitor.

An OPGAE editing session begins when a user selects an application to edit. The selection causes the OPGAE 2 to command the GT 43 to convert the application's OPG 42 into a NEG 41. The initial conversion creates a partially populated basic instance of a NEG 41 for the OPG application. Subsequently, as the user manipulates and changes the graphical representation of the OPG application, the OPGAE 2 interacts with the NEG 41 keeping it consistent with the user's view of the application, which includes adding and deleting nodes and edges. When a user commands the OPGAE 2 to save changes, the OPGAE 2 commands the GT 43 to convert any changes made to the NEG 41 into updates of the persistent OPG application. The OPGAE 2 can also command the GT 43 to revert the NEG 41 to the last version that was made persistent.

Both the OPG 42 and the NEG 41 are composite layered graphs consisting of directed graphs that include a set of directed graphs and a set of trees. Each node within the graph belongs to both a directed graph and a tree. The directed graph to which each node belongs defines its relationships with other nodes within that graph. The tree to which the node belongs defines the composition hierarchy to which it belongs. A node may belong to multiple directed graphs as well as multiple composition hierarchies. Unlike an OPG, the NEG 41 is not persistent; special NEG elements needed by the GT 43 to create a NEG 41 from an OPG 42 are persistent in the OPG 42. The primary purpose of the NEG 41 is to maintain the state of a particular editing session, and it only exists during the life cycle of its associated session. As editing proceeds, NEG components that correspond to the node and edge components of an OPG 42 are instantiated or deleted. NEG component functions are optimized for editor-oriented functions. OPG component functions, on the other hand, are optimized for interpreting (running) applications. In some cases, the NEG 41 supports a simplified or more conceptual view of a subgraph within an OPG 42, especially with respect to data transformations and access to complex data structures.

Figure 21:
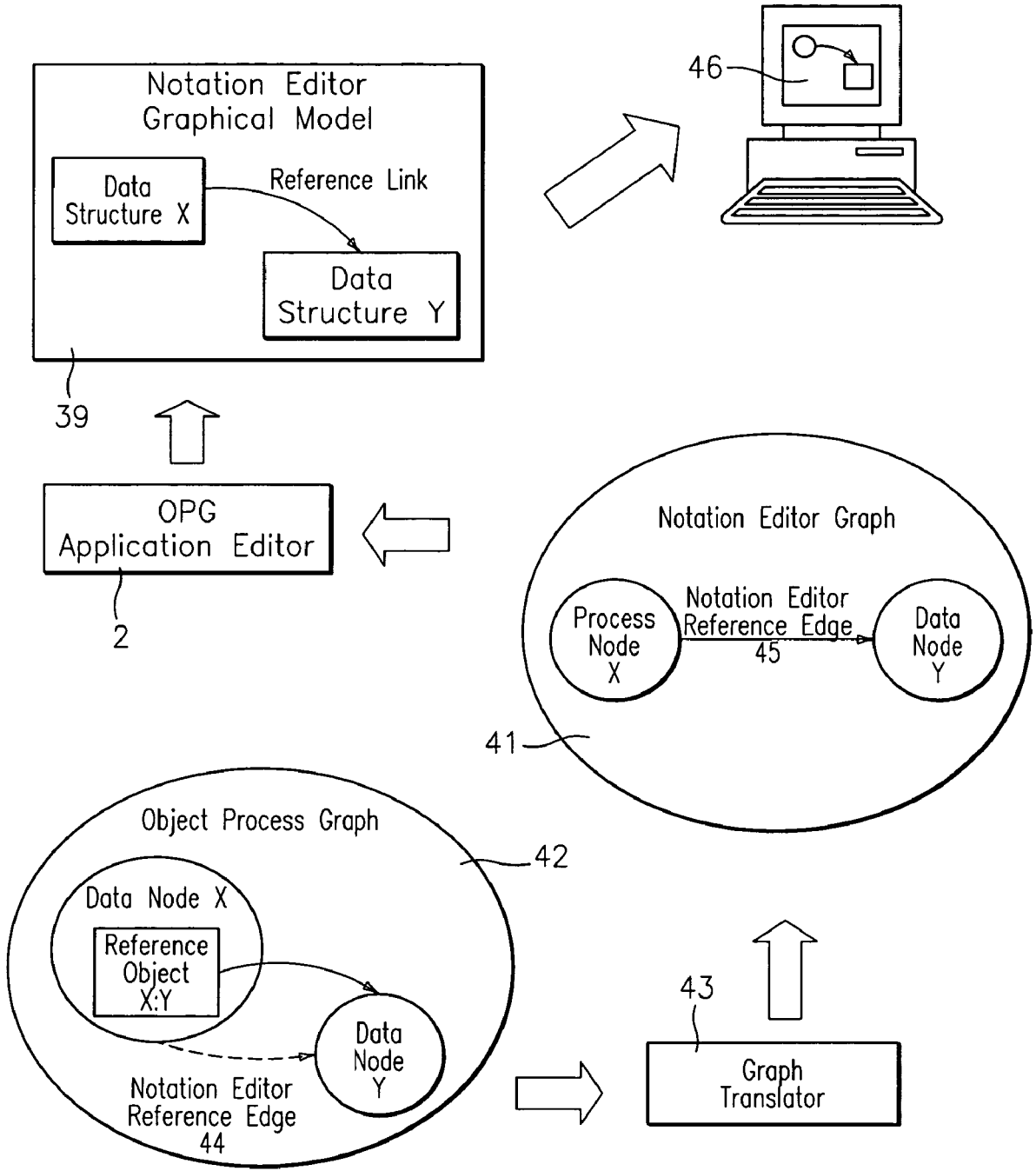
FIG. 21 is a notation editor graph translation exemplar according to exemplary embodiments of the present invention.

OPG data nodes include detailed definitions of data accesses to be performed, such as references to data structures. FIG. 21 shows an example of such a reference. In this case, the OPG 42 includes a notation editor reference edge 44 that is ignored by the DGI, but is used by the GT 43 to construct a conceptual reference from data node X to data node Y (i.e., a notation editor reference edge 45) in the NEG 41. The OPGAE 2 creates the notation editor graphical model 39 from the NEG 41 that renders a link between the data structures of the correct type and in a color that identifies it to the user 46. The notation editor reference edge 44 is persistent in the OPG 42. Other graph elements that represent special notation editor concepts are provided by the OPG 42.

The OPG 42 also has provisions for storing the display properties of elements in the OPGAE notation editor graphic model 39 in special structures within the OPG application. The GT 43 moves the display properties between the graphs as required during conversions. This makes it possible for the OPGAE 2 to maintain the element arrangement of a graphical representation of an OGP application from one editing session to the next. Display properties include the size and shape of a graphical element and its location on a composition canvas.

The GT 43 ensures that the OPG 42 and the NEG 41 are consistent each time a user saves changes made to the graphical model. It generates add, remove and update commands to the DGI based on differences between the two graph structures.

The GT 43 insulates the detailed design of the OPG 42 and the NEG 41 from each other. Thus, the affect of changes made to either structure will normally be limited to the GT 43.

The OPGAPI 3 can be used by other application systems to generate, modify and delete OPG applications. It can also be used to render OPG applications in other electronic forms, e.g. HTML and/or XML.

The OPGAPI 3 functions are listed below in two groups, those that are implemented by the GT 43 and those implemented by the NEG 41. In general, the GT functions affect an entire graph, whereas NEG functions affect an element or subgraph of a graph. A brief description of each function and any required parameters is included. Check functions are provided that indicate if a function can be performed given the current state of an application's OPG or a subgraph of an OPG 42 and the OPG rules that apply to the function. This enables an editor to provide visual cues to a user. Name parameters are defined with dot notation beginning with the application name followed by node names in the OPG down to the node of interest. The node structure of an OPG application and their naming conventions are described in the Object Process Graph System patent application. The following is an example of a node name "payroll.department.employee.name."

GT Functions (Affect an Application's Total Graph)

Create Application (an Application Name)—Creates an application and gives it the specified name. The application is represented by an application node. Application names must be unique on an OPG System.

Delete Application (an Application Name)—Deletes the application specified by name. All of the nodes that are part of the application are also deleted. Applications with a running instance cannot be deleted.

Load Application (an Application Name)—Transforms the named application into a NEG 41 that provides the functions described below.

Save Application (an Application Name)—Saves any changes made to the NEG 41 of the application as persistent changes to its OPG 42.

NEG Functions (affect a specific process node, data node or a subgraph)

Add Process Node (a Parent Node Name, a Node Name, a Process Node Type)—Creates either a new operation or report node as specified by the process node type and adds it to the parent node's set of process nodes. The parent node must be a process node. The node name must be unique within the parent's process node set.

Can Add Process Node (a Parent Node Name, a Process Node Type)—Determines if a process node of the specified type can be added to the named parent. This function returns a true or false answer.

Delete Process Node (a Parent Node, a Node Name)—Deletes the named node from the named parent's set of process nodes. It deletes the node and all of its associated nodes from the OPG 42 and all of its to and from edges.

Can Delete Process Node (a Parent Node Name, a Node Name)—Determines if the named process node can be deleted from the named parent's set of process nodes. This function returns a true or false answer.

Delete Data Definition Node (a Parent Node Name, a Node Name)—Deletes the named node from the named parent's set of data nodes. It deletes the node and all of its associated nodes from the OPG 42 and all of its to and from edges.

Can Delete Data Definition Node (a Parent Node Name, a Node Name)—Determines if the named node can be deleted from the named parent's set of data nodes. This function returns a true or false answer.

Add Data Definition Node (a Parent Node Name, a Node Name, a Data Node Type)—Creates a data node of the specified name and type. The data node may be a Composite Data Node (a node with child nodes) or a Primitive Data Node (a node that has no child nodes) if the named parent is a data node. The data node must be a Composite Data Node if the named parent is a process node.

Can Add Data Definition Node (a Parent Node Name, a Node Name)—Determines if the named data node can be deleted from the named parent node. This function returns a true or false answer.

Modify a Node Property (a Node Name, a Property Name, a New Property Value)—Set the value of the named property of the specified node to the new property value, Can Modify a Node Property (a Node Name, a Property Name, a New Property Value)—Determine if the value of the named property of the named node can be set to the new property value. This function returns a true or false answer.

Add Edge (a From Node Name, a To Node Name, an Edge Name)—Creates a new edge with the specified name to the from node's set of out-pointing edges and adds it to the to node's set of in-pointing edges. An edge of one of the OPG edge categories: process-to-process, process-to-data or data-to-data, is created automatically based on the to and from node types.

Can Add Edge (a From Node Name, a To Node Name, an Edge Name)—Determines if a new edge can be added to the from node's set of out-pointing edges and to the to node's set of in-pointing edges. This function returns a true or false answer.

Delete Edge (a From Node Name, a To Node Name, an Edge Name)—Deletes the named edge and the 'from' node and 'to' node references to itself.

Can Delete Edge (a From Node Name, a To Node Name, an Edge Name)—Determines if the named edge and the 'from' node and 'to' node references can be deleted. This function returns a true or false answer.

Modify an Edge's type (a From Node Name, a To Node Name, an Edge Name, an Edge Type)—changes the named edge's type to the specified edge type. The defined edge type must be valid for the named edge's category. The following are valid edge types for each edge category:

Process-to-process edges
Unconditional display
Unconditional queue
Unconditional batch
Conditional display
Conditional queue
Conditional batch
Process-to-data edges
Create data
Data-to-data edges
Move data to
Get data from
Merge data
Split data
Retrieve data
Compute with
Join data Can Modify an Edge's type (a From Node Name, a To Node Name, an Edge Name, an Edge Type)—Determines if the named edge's type can be changed to the specified edge type. The defined edge type must be valid for the named edge's category. This function returns a true or false answer.

Modify an Edge Property (an Edge Node Name, a Property Name, a New Property Value)—Set the value of the named property of the specified edge to the new property value.

Can Modify an Edge Property (a Node Name, a Property Name, a New Property Value)—Determine if the value of the named property of the named edge can be changed to the specified new property value. This function returns a true or false answer.

Exemplary OPG Application Development System (OPGADS) Creation Process

The following is a description of an exemplary process for creating an OPGADS, such system having been defined and described above. Included is one embodiment of this process, others are also possible.

Assuming the existence of an embodiment of an OPG System 5 of which the OPGADS is to become a part, an initial set of hardware/operating system platforms, programming frameworks, database and/or file systems and display media with which to build and run the OPGADS system are chosen. These items selected must be the same as or compatible with that used to build the OPG system embodiment. In one exemplary embodiment, the Windows XP operating system, running on Intel based computer hardware is utilized. In addition, the Java programming language from Sun Microsystems, the Eclipse Tools Platform from the Eclipse Foundation, the GEF and Draw2D framework from the Eclipse Foundation, the Jakarta Struts framework, Java Server Pages (JSP) and Cascading Style Sheets (CSS) are also utilized to develop the OPGADS system. This exemplary embodiment will execute, with no programming changes, on a hardware platform that is executing Windows XP, Linux, Solaris 8, AIX, HP-UX, and MAC-OSX operating systems. Note that the above operating systems, application platforms and programming languages tools represent just one possible configuration of development and operational systems that can be used to create and run exemplary embodiments of the present invention.

Using the summary and description of the invention above, along with the accompanying figures, the three major software components of the OPGADS can be implemented for exemplary embodiments as described in the following paragraphs. Other implementations are also possible. An OPGAPI 3 should be implemented first since it is needed to interface the OPGAE 2 to the OPG System 5. To do this, one or more classes and appropriate class hierarchies are defined that will encompass the functionality of the GT 43.

Figure 22:
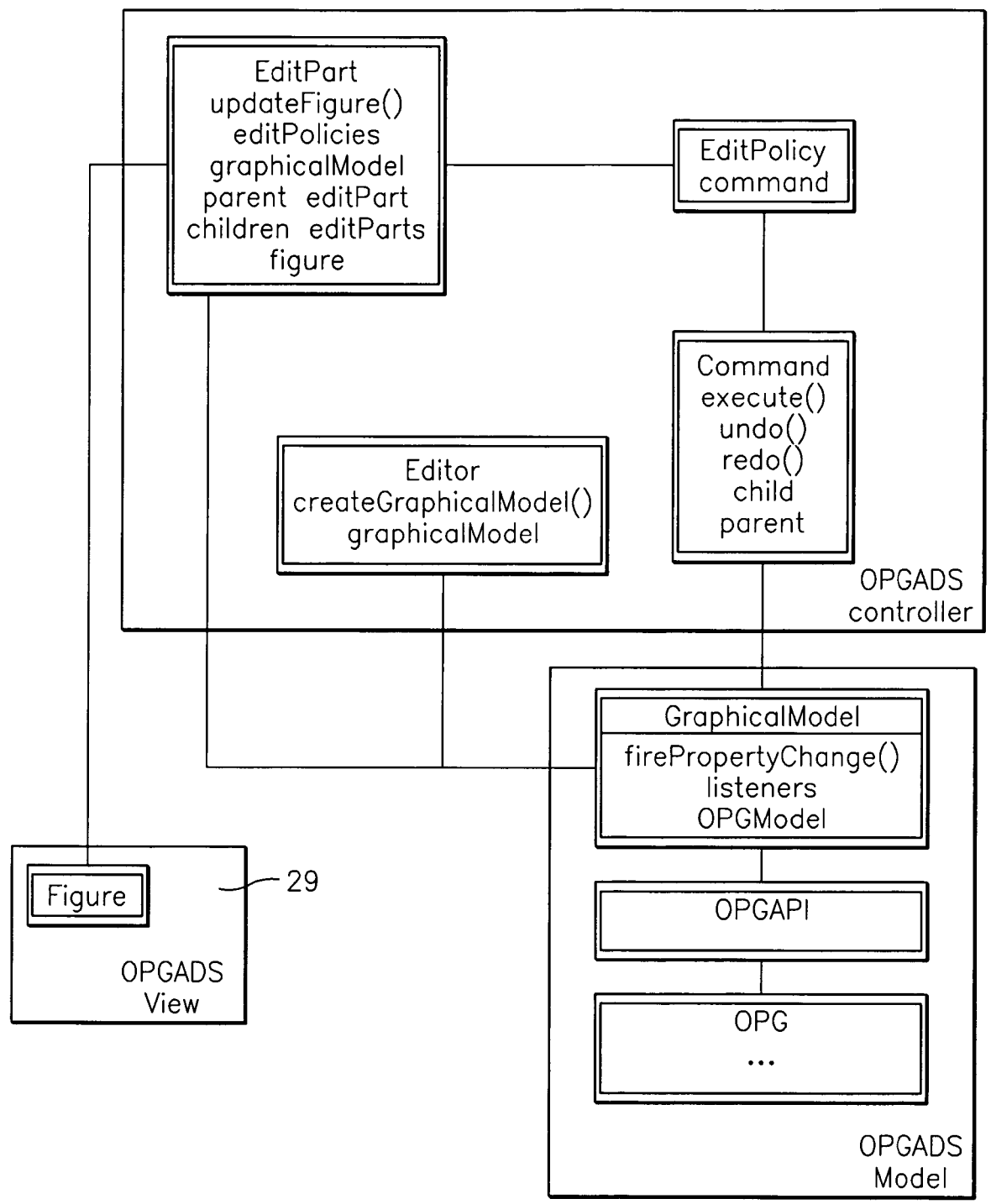
FIG. 22 is an OPG application developer exemplar according to exemplary embodiments of the present invention.

To implement the OPGAE 2, three groups of classes representing the model, view and controller elements based on the GEF and Draw2D frameworks are defined. FIG. 22 depicts an exemplary arrangement of these classes.

The OPGAV 29 component is represented by the Figure class in FIG. 22 and is an extension of the GEF figure classes. The Figure classes represent the notation of the domain to the user. In the exemplary embodiment depicted in FIG. 22, the view is implemented with five classes: DataFigure, StructuredDataFigure, DataArrayFigure, StructuredDataArrayFigure and StructuredoperationFigure.

The OPGADS controller component is implemented with four sets of classes: Editor, EditPart, EditPolicy and Command. In exemplary embodiments there is a single Editor class and there are five EditPart classes: DataPart, DataArrayPart, StructuredDataPart, StructuredDataArrayPart and StructuredOperationPart. In addition, there are three EditPolicy classes: ElementComponentEditPolicy, ElementContainerEditPolicy and ElementXYLayoutEditPolicy. Further, there are five Command classes: AddCommand, ConnectionCommand, CreateCommand, DeleteCommand and SetConstraintCommand.

The Model component is implemented with two sets of classes: GraphicalModel and OPGModel. There are five GraphicModel classes: Data, DataArray, StructuredData, StructuredDataArray, StructuredOperation classes. There are three OPGModel classes: NetworkNode, NetworkLink and UserNetwork.

In exemplary embodiments, and as described previously, the OPGAWE 4 is implemented as an extension to the OPGACV. This facilitates interfacing directly with running OPG programs. The editor functionality of the OPGAWE 4 is implemented by an editor class that is an extension of the session action class of the OPGACV. The editor tool bar is implemented with CSS style sheets. The application data display JSP's and CSS style sheets of the OPGACV are utilized to display the application's data in the WYSIWYG editor of the OPGAWE 4.

Finally, the OPG feature that enables users to define an application frame within an OPG application window can be implemented, in an exemplary embodiment, as follows. A frame definition option is required in the OPGAWE 4 to define a frame within a window. The user will define a file type, which implies an application. At run-time, the user starts the application by clicking on the frame, which will cause the Internet Explorer browser to start the application. When the user finishes with the program, the user can save an updated file in the OPG database at a temporary location. OPG classes and DGI functions can be implemented to perform these functions. In addition, a small Java program must be implemented to support this feature. The program will run on its own thread and will periodically look for instructions in a special OPG location that defines a user request to save application changes. When it finds such an instruction, it moves the associated file from its local OPG location to its original source location.

Object Process Graph Description

OPG 37 is the definition component of the OPG System 5, a complete application development and execution environment. Other components include a DGI that interprets or executes applications defined by OPGs 37 and a graphical user interface for creating and modifying OPGs 37.

Exemplary embodiments of the OPG may be considered a computer language (it is Turing complete) that is interpreted as the program is executed. An OPG 37 is stored in transient and persistent computer memory. An OPG 37 can hold any data structure, which includes, but is not limited to: relational tables, hierarchical tables, n-dimensional data arrays, spreadsheets, graphical models and 3-D physical models. These data structures are not stored as blobs, which is common in relational database systems, but in special OPG structures that reflect their original structure and internal relationships. OPG process and control structures provide control over the order and timing of persistent and transient data validation, transformation and display within an application. OPG structures can also define mathematical formulas, regular expressions (in the case of textual data or mixed quantitative and textual data) and complete algorithms. In exemplary embodiments, the OPG 37 includes a graph structure. The graph structure is dynamic, directed and cyclical, and defines an OPG application. The graph structure may have at least one data node, at least one process node, and at least one application state node. The DGI, such as DGI 27, interprets the graph structure to process and execute the OPG application. The DGI can act on the graph structure by changing application state information held in at least one application state node, where the application state information includes one or more transient data objects and persistent data objects. The graph structure may be changed, while the graph structure is being interpreted by the DGI.

An application's OPG 37 can be rendered on a computer terminal or static output medium, e.g. paper. OPG data, process and control structures displayed on an interactive medium can be edited. Unlike traditional software development systems, editing an application's OPG 37 does not generate code that must be compiled and installed. Instead, changes are made and take affect immediately. Changes can even be made while the DGI is interpreting (running the application). The ability to safely change an application at any time is desired for rapid development and the long-term maintenance of large, complex enterprise-wide application systems.

All application execution state information in an OPG 37 is held in application state objects. The DGI acts on the OPG 37 by changing the application state information it holds. Application state information can include any persistent data object. A DGI may operate on multiple application states concurrently, merging or splitting state information between combinations of application state objects.

An OPG 37 maintains audit trail information for all persistent and transient data changes in an application—at the primitive data level. Audit trail information is readily available for display on a user interface, via display controls or for further update and manipulation in an application's process and data flows.

Audit information defining changes made in long and short transactions is maintained and tracked for all changes to the persistent data of an application. Long transactions enable the system to organize, control and track changes to all persistent data. Such changes can take place over an extended period of time (days or weeks) over many work sessions. Short transactions, on the other hand, are made during a single user session or interaction with the system. Long and short transaction information is immediately available for manipulation and display within the application, via a system's graphical user interfaces. Tracking long transactions also facilitates rollbacks to any point in a transaction and deletions of a transaction (with audit trails) are automatically available via the application interface. Control of access to all functionality and data within the application by users is available through the system interface. This includes separate access rights (read, write, rollback) for each primitive data item defined as part of an application for each user.

In addition to data entered or changed via a user interface, an embodiment of the system also accepts input data to application processes in any digital format from other systems.

Exemplary embodiments include a GUI. A GUI can enable a user to specify the format of all input that is then automatically parsed and used to update an application—adding to or modifying persistent data in the database or transient data in the application or display interfaces—at any point in the application process.

Output data may likewise be created in any format from any point in an application (for persistent or transient data), using the inverse of the above process in various embodiments. In some embodiments, external databases, such as relational databases, may be registered with an application, and all persistent data within the application may be stored in or retrieved from such databases.

Embodiments of the OPG 37 component of exemplary embodiments extend the basic functionality of traditional graph object-oriented databases. Embodiments of the present invention synthesize the functionality of dynamic process elements and graph object oriented databases into a single integrated system, which makes it possible to rapidly create complete, complex enterprise wide applications without a traditional programming language. An OPG 37 is directly and dynamically interpreted, therefore no code generation is required. The ease of changing an OPG 37 and the immediate feedback resulting from changes greatly simplifies maintaining and changing OPG based applications.

Although the present invention has been described in considerable detail with reference to certain embodiments, other embodiments are possible. For example, different operating systems, programming languages, and software architectures may be used to practice embodiments of the present invention. Therefore, the spirit and scope of the appended claims should not be limited to the description of the embodiments contained herein.

As described above, the embodiments of the invention may be embodied in the form of hardware, software, firmware, or any processes and/or apparatuses for practicing the embodiments. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. An object process graph (OPG) application development system, the system comprising:
 a computing device, computer memory, and a user interface including a user interface screen;
 an OPG application program interface (API), the OPG API providing access to functions of an OPG system, the OPG system comprising:
 a graph structure stored in the computer memory for defining an OPG application, the graph structure including process and control elements for control over an order and a timing of data validation, transformation and display, and the graph structure being dynamic, directed and cyclical; and
 an interpreter for interpreting the graph structure absent code generation to process and execute the OPG application on the computing device;

an OPG application editor for facilitating creating and editing of one or more of the OPG applications via the OPG API;

an OPG application window editor for facilitating graphical editing of OPG application user interface windows via the user interface while one of the OPG applications is running on the computing device; and an OPG application notation that includes a plurality of key words and associated definitions for describing and defining the OPG applications.

2. The system of claim 1, wherein the OPG API provides interface functions that enable the OPG applications to dynamically interact and exchange information with other systems.

3. The system of claim 1, wherein the OPG API provides functions that dynamically render represent persistent OPGs.

4. The system of claim 1, wherein the OPG API updates persistent OPGs as corresponding graphical software models are updated, and further wherein the updated graphical software models are displayed on the user interface screen.

5. The system of claim 1, wherein the OPG application editor includes an editor graphical model interface that utilizes the OPG API to render graphical software models that correspond to persistent OPGs, the OPG API comprising a notation editor graph (NEG) and a graph translator (GT), the OPG application editor commanding the GT to convert one of the persistent OPGs into the NEG.

6. The system of claim 1, wherein the OPG application editor includes an editor viewer for rendering graphical software models on the user interface screen that correspond to persistent OPGs, wherein the graphical software models include one or more of graphic symbols, icons, lines, pictures, text, images and window control elements.

7. The system of claim 6, wherein the OPG application editor includes an editor controller for transforming user input requests to move, add, delete and update components of the graphical software models rendered from the persistent OPGs into editor graphical model interface function requests that cause the editor viewer to update the graphical software models and the OPG API to update the persistent OPGs.

8. The system of claim 7, wherein the editor controller responds to user selections and inputs from a keyboard, mouse or other input device based on a position of a display cursor over window control elements displayed on a set of workspace views rendered by the OPG application editor and a type of window control element.

9. The system of claim 8, wherein the workspace views include one or more of a palette view for displaying graphic components that can be selected for inclusion in the graphical software models, a component view for displaying a graphic representation of an OPG or sub-graph, an application navigator view for displaying a tree view of an OPG, a repository view for listing repository files containing OPGs, a property view for displaying property names and values of OPG graph nodes and edges, and a component outline view for displaying a tree view of the graphic components of a graph component selected and displayed on a component view.

10. The system of claim 1, wherein the OPG application window editor includes window editor control components added to and integrated with an OPG controller-viewer.

11. The system of claim 10, wherein the window editor control components display editor selection controls on OPG application data display windows that enable a user to select either the OPG application window editor or an application window's data visibility properties editor while a corresponding OPG application is running.

12. The system of claim 1, wherein the OPG application window editor provides a What You See Is What You Get (WYSIWYG) style editor that enables users to immediately see the effect of changing, adding or deleting data window display elements on application data display windows.

13. The system of claim 1, wherein the OPG application window editor makes application data display window display elements selectable, moveable, editable and deletable, wherein the window display elements include one or more of window controls, text boxes, labels, text editors, lines, shapes, pictures, images and icons.

14. The system of claim 1 wherein the OPG application window editor displays an editor tool bar containing a plurality of editor controls that enable users to apply editor functions to selected application data display window elements including adding or deleting elements, changing text properties, resizing and repositioning elements, and changing the color of elements.

15. A method for developing an object process graph (OPG) application, the method comprising:

receiving a command specifying an element in a graph structure, wherein the graph structure is a computer program, the graph structure stored in computer memory for defining the computer program as the OPG application, the graph structure including process and control elements for control over an order and a timing of data validation, transformation and display, and the graph structure being dynamic, directed and cyclical, the graph structure interpreted absent code generation by an interpreter to process and execute the computer program on a computing device; and modifying the graph structure of the computer program in real time in response to the command, while the computer program is running.

16. The method of claim 15 further comprising displaying a graphical representation of the computer program on a user interface screen, wherein the command is received via a user interface input device.

17. The method of claim 15 further comprising displaying a graphical representation of the modified computer program on a user interface screen.

18. The method of claim 15 wherein the modified computer program is utilized by all transactions subsequently processed by the computer program.

19. The method of claim 15 wherein the modified computer program is utilized by selected transactions subsequently processed by the computer program.

20. The method of claim 15 wherein the modified computer program is utilized by a transaction currently being processed by the computer program.

21. The method of claim 15 wherein the element includes one or more of a component, and a link.

22. The method of claim 21 wherein the component includes one or more of an application component, a process component, a data structure component, a data structure array component, and a primitive data component.

23. The method of claim 15 wherein the command specifies one or more of view the element, add the element, modify the element and delete the element.

24. The method of claim 15 wherein the computer program is executing concurrently with the receiving and the method further comprises displaying output from the computer program via a user interface screen.

25. The method of claim 24 further comprising displaying output from the modified computer program via the user interface screen.

26. A method for developing an object process graph (OPG) application, the method comprising:
- creating a computer program as a graph structure, the graph structure stored in computer memory for defining the computer program as the OPG application, the graph structure including process and control structures providing control over order and timing of persistent and transient data validation, transformation and display, and the graph structure being dynamic, directed and cyclical, the graph structure interpreted absent code generation by an interpreter to process and execute the computer program on a computing device;
- displaying a graphical representation of the graph structure on a user interface screen;
- receiving a command specifying an element in the graph structure;
- modifying the computer program in real time in response to the command;
- updating the graph structure in response to the command; and
  - displaying a graphical representation of the updated graph structure on the user interface screen.

27. The method of claim 26 wherein the graph structure maintains audit trail information for all persistent and transient data changes at a primitive data level.

28. The method of claim 26 wherein displaying the graphical representation of the graph structure and the updated graph structure is via one or more of an OPG application editor and an OPG application window editor.

29. The method of claim 26 wherein the modifying is via one or more of an OPG application program interface and an OPG application window editor interfacing with an OPG system comprised of the graph structure and the interpreter.

30. A computer program product for developing an object process graph (OPG) application, the computer program product comprising:
- a storage medium readable by a processing circuit and storing instructions for execution by the processing circuit for performing a method, the method including:
  - receiving a command specifying an element in a graph structure, wherein the graph structure is a computer program, the graph structure stored in computer memory for defining the computer program as the OPG application, the graph structure including process and control elements for control over an order and a timing of data validation, transformation and display, and the graph structure being dynamic, directed and cyclical, the graph structure interpreted absent code generation by an interpreter to process and execute the computer program on the processing circuit; and
  - modifying the graph structure of the computer program in real time in response to the command, while the computer program is running.

31. A computer program product for developing an object process graph (OPG) application, the computer program product comprising:
- a storage medium readable by a processing circuit and storing instructions for execution by the processing circuit for performing a method, the method including:
  - creating a computer program as a graph structure, the graph structure stored in computer memory for defining the computer program as the OPG application, the graph structure including process and control structures providing control over order and timing of persistent and transient data validation, transformation and display, and the graph structure being dynamic, directed and cyclical, the graph structure interpreted absent code generation by an interpreter to process and execute the computer program on the processing circuit;
  - displaying a graphical representation of the graph structure on a user interface screen;
  - receiving a command specifying an element in the graph structure;
  - modifying the computer program in real time in response to the command;
  - updating the graph structure in response to the command; and
    - displaying a graphical representation of the updated graph structure on the user interface screen.

* * * * *